(12) United States Patent
Harada et al.

(10) Patent No.: US 11,985,092 B2
(45) Date of Patent: May 14, 2024

(54) TERMINAL, RADIO COMMUNICATION METHOD, AND BASE STATION

(71) Applicant: NTT DOCOMO, INC., Tokyo (JP)

(72) Inventors: Hiroki Harada, Tokyo (JP); Kazuaki Takeda, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 267 days.

(21) Appl. No.: 16/895,478

(22) Filed: Jun. 8, 2020

(65) Prior Publication Data

US 2020/0304270 A1 Sep. 24, 2020

Related U.S. Application Data

(63) Continuation of application No. 16/098,975, filed as application No. PCT/JP2017/017187 on May 1, 2017, now abandoned.

(30) Foreign Application Priority Data

May 6, 2016 (JP) .................................. 2016-093482

(51) Int. Cl.
*H04L 5/00* (2006.01)
*H04W 28/04* (2009.01)
(Continued)

(52) U.S. Cl.
CPC ........... *H04L 5/0055* (2013.01); *H04W 28/04* (2013.01); *H04W 72/04* (2013.01);
(Continued)

(58) Field of Classification Search
CPC ... H04L 5/0055; H04L 1/1854; H04L 1/1861; H04L 1/1864; H04W 28/04;
(Continued)

(56) References Cited

U.S. PATENT DOCUMENTS 6,728,918 B1 4/2004 Ikeda et al.
2008/0293424 A1 11/2008 Cho et al.
(Continued)

FOREIGN PATENT DOCUMENTS

EP 2481179 A1 8/2012
WO 2010057540 A1 5/2010

OTHER PUBLICATIONS

Office Action issued in European Application No. 17792764.7; dated Mar. 3, 2021 (5 pages).
(Continued)

*Primary Examiner* — Mang Hang Yeung
(74) *Attorney, Agent, or Firm* — Osha Bergman Watanabe & Burton LLP

(57) ABSTRACT

A terminal is disclosed that includes a transmitter that performs uplink (UL) transmission without a UL grant using a resource configured by higher layer signaling, a receiver that receives retransmission command information, which indicates a retransmission command for the UL transmission, and a processor that controls a resource used for retransmission of the UL transmission by units of symbols based on the retransmission command information. In other aspects, a base station and a radio communication method for a terminal are disclosed.

5 Claims, 16 Drawing Sheets

(51) Int. Cl.
*H04W 72/04* (2023.01)
*H04W 72/0446* (2023.01)
*H04W 72/20* (2023.01)
*H04W 72/23* (2023.01)

(52) U.S. Cl.
CPC ....... *H04W 72/0446* (2013.01); *H04W 72/20* (2023.01); *H04W 72/23* (2023.01)

(58) Field of Classification Search
CPC ............. H04W 72/04; H04W 72/0446; H04W 72/1278; H04W 72/14
USPC .......................................................... 370/336
See application file for complete search history.

(56) References Cited

U.S. PATENT DOCUMENTS

| | | | |
|---|---|---|---|
| 2011/0223924 A1* | 9/2011 | Lohr | .................... H04L 1/1607 455/450 |
| 2011/0292895 A1 | 12/2011 | Wager et al. | |
| 2012/0163322 A1 | 6/2012 | Larmo et al. | |
| 2013/0195041 A1* | 8/2013 | Papasakellariou | .... H04L 1/0038 370/329 |
| 2015/0009874 A1* | 1/2015 | Edara | ................ H04W 72/1268 370/311 |
| 2015/0029964 A1* | 1/2015 | Seo | ....................... H04L 5/0053 370/329 |
| 2015/0110038 A1 | 4/2015 | Yang et al. | |
| 2015/0180616 A1 | 6/2015 | Lee et al. | |
| 2015/0289234 A1 | 10/2015 | Zhao et al. | |
| 2016/0353436 A1 | 12/2016 | Au et al. | |
| 2016/0366594 A1 | 12/2016 | Chang et al. | |
| 2018/0007709 A1 | 1/2018 | Seo et al. | |
| 2019/0081744 A1 | 3/2019 | Yang et al. | |
| 2019/0230647 A1 | 7/2019 | Yang et al. | |
| 2019/0274134 A1 | 9/2019 | Wang et al. | |

OTHER PUBLICATIONS

International Search Report issued in PCT/JP2017/017187 dated Jul. 25, 2017 (1 page).
Written Opinion of the International Searching Authority issued in PCT/JP2017/017187 dated Jul. 25, 2017 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Extended European Search Report issued in European Application No. 17792764.7, dated Nov. 21, 2019 (8 pages).

* cited by examiner

| FREQUENCY RESOURCE INDEX | UE GROUP INDEX | RETRANSMISSION COMMAND |
|---|---|---|
| #1 | #2 | A |
| #3 | #1 | A |
| #4 | all | N |

TERMINAL, RADIO COMMUNICATION METHOD, AND BASE STATION

CROSS-REFERENCE TO RELATED APPLICATIONS

This application is a continuation application of U.S. patent application Ser. No. 16/098,975, filed on Nov. 5, 2018, which is a national phase application of PCT/JP2017/017187, filed on May 1, 2017, which claims priority to Japanese Patent Application No. 2016-093482, filed on May 6, 2016. The contents of these applications are hereby incorporated by reference in their entirety.

TECHNICAL FIELD

The present invention relates to a user terminal and a radio communication method in next-generation mobile communication systems.

BACKGROUND ART

In the UMTS Universal Mobile Telecommunications System) network, the specifications of long-term evolution (LTE) have been drafted for the purpose of further increasing high speed data rates, providing lower delays and so on (see non-patent literature 1). In addition, successor systems of LTE are also under study for the purpose of achieving further broadbandization and increased speed beyond LTE (referred to as, for example, "LTE-A (LTE-Advanced)," "FRA (Future Radio Access)," "4G," "5G," "5G+ (plus)," "NR (New RAT)," "LTE Rel. 14," "LTE Rel. 15 (or later versions)," and so on).

In existing LTE systems (for example, LTE Rel. 8 to 13), when UL synchronization is established between a radio base station and a user terminal, UL data can be transmitted from the user terminal. For this reason, in existing LTE systems, random access procedures (also referred to as "RACH procedures (Random Access CHannel Procedures)," "access procedures," and so on) for establishing UL synchronization are supported.

In random access procedures, a user terminal acquires information related to UL transmission timing (timing advance (TA) from a response (random access response) which a radio base station sends out in response to a randomly selected preamble (random access preamble), and the user terminal establishes UL synchronization based on this TA.

After UL synchronization is established, the user terminal receives downlink control information (DCI) (UL grant) from the radio base station, and then transmits UL data using the UL resource allocated by the UL grant.

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (for example, 5G, NR, etc.), it is desirable to accommodate various services such as high-speed and large-capacity communication (eMBB: enhanced Mobile Broad Band), massive access (mMTC: massive MTC) from devices (user terminal) for inter-device communication (M2M: Machine-to-Machine) such as IoT (Internet of Things) and MTC (Machine Type Communication), and low-latency, reliable communication (URLLC: Ultra-Reliable and Low Latency Communication), in a single framework.

In such future radio communication systems, if random access procedures are performed in the same way as in existing LTE systems before UL data is transmitted, the latency time before UL data starts being transmitted will pose a problem. Also, in future radio communication systems, there is a possibility that the growth of overhead due to UL grants from radio base stations will pose a problem.

Therefore, in future radio communication systems, for the purpose of shortening the latency time before UL data starts being transmitted and reducing the growth of overhead, a study is in progress to allow contention of UL transmission among a plurality of user terminals and to transmit UL data without UL grants from radio base stations (also referred to as "contention-based UL transmission," "UL grant-less (-free) UL transmission," "UL grant-less and contention-based UL transmission," etc.). In such contention-based UL transmission, how to perform retransmission control is the problem.

The present invention has been made in view of the above, and it is therefore one of the objects of the present invention to provide a user terminal and a radio communication method, whereby retransmission control that is suitable for contention-based UL transmission can be performed.

Solution to Problem

A user terminal, according to one aspect of the present invention, has a transmission section that transmits uplink (UL) data, and a control section that controls retransmission of the UL data, and the control section controls the retransmission of the UL data based on retransmission command information, which provides a retransmission command for the UL data by a frequency resource, or by a resource group, which includes the frequency resource.

Advantageous Effects of Invention

According to the present invention, retransmission control that is suitable for contention-based UL transmission can be performed.

DESCRIPTION OF EMBODIMENTS

Existing LTE systems (for example, LTE Rel. 8 to 13) support random access procedures for establishing UL synchronization. Random access procedures include contention-based random access (also referred to as "CBRA" and so on) and non-contention-based random access (also referred to as "non-CBRA," "contention-free random access (CFRA)," and so on).

In contention-based random access (CBRA), a user terminal transmits a preamble, which is selected randomly from a plurality of preambles provided for each cell (also referred to as "random access preambles," "random access channels (PRACHs)," "RACH preambles" and so on). Furthermore, contention-based random access is user terminal-initiated random access procedures, and can be used, for example, when gaining initial access, when starting or resuming UL transmission, and so on.

On the other hand, in non-contention-based random access (non-CBRA, CFRA, etc.), the radio base station assigns preambles, in a user terminal-specific manner, by using downlink (DL) control channels (a PDCCH (Physical Downlink Control Channel), an EPDCCH (Enhanced PDCCH), etc.), and the user terminals transmit the preambles assigned by the radio base station. Non-contention-based random access is network-initiated random access procedures, and can be used, for example, when conducting handover, when starting or resuming DL transmission, and so on (when transmission of DL retransmission command information is started or restarted in UL).

Figure 1:
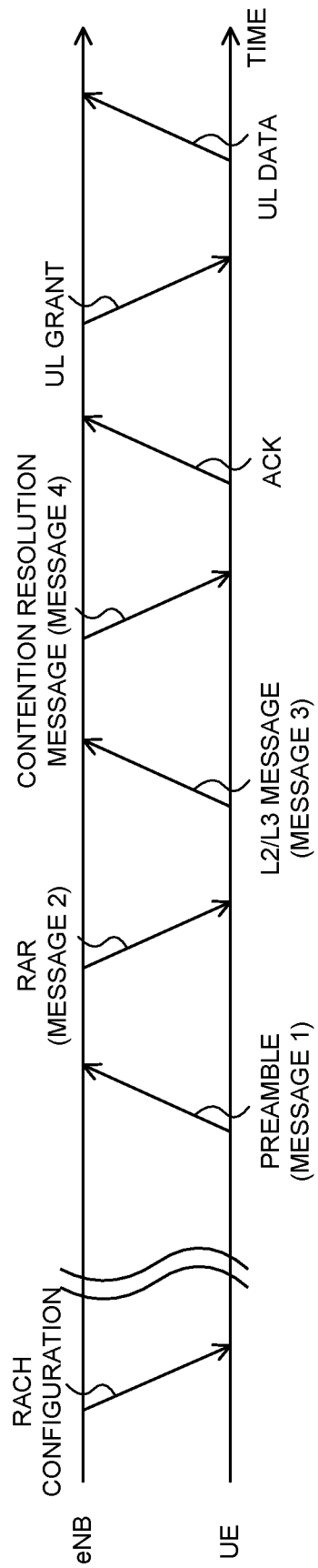
FIG. 1 is a diagram to show an example of contention-based random access procedures.

FIG. 6 is a diagram to show an example of contention-based random access procedures. In FIG. 1, a user terminal receives, in advance, information (PRACH configuration information) that indicates the configuration of a random access channel (PRACH) (PRACH configuration, RACH configuration, etc.), via system information (for example, the MIB (Mater Information Block) and/or SIBs (System Information Blocks)), higher layer signaling (for example, RRC (Radio Resource Control) signaling) and so on.

The PRACH configuration information can indicate, for example, a plurality of preambles (for example, preamble formats) that are defined in each cell, the time resources that are used in PRACH transmission (including, for example, a system frame index, a subframe index and so on) and the offset (prach-FrequencyOffset) to indicate the starting position of frequency resources (for example, six resource blocks (PRBs (Physical Resource Blocks))).

As shown in FIG. 1, when the user terminal transitions from idle mode (RRC_IDLE) to RRC-connected mode (RRC_CONNECTED) (for example, when gaining initial access), if UL synchronization is not established despite the fact that the user terminal is in RRC-connected mode (for example, when UL transmission is started or resumed), the user terminal can randomly select one of a plurality of preambles that are indicated in the PRACH configuration information, and transmit the selected preamble using the PRACH (message 1).

Upon detecting the preamble, the radio base station transmits a random access response (RAR) (message 2) in response to that. If the user terminal fails to receive a RAR within a predetermined period (RAR window) after the preamble is transmitted, the user terminal increases the transmission power of the PRACH and transmits the preamble again (retransmission). Note that the act of increasing the transmission power upon retransmission is also referred to as "power ramping."

Upon receiving the RAR, the user terminal adjusts the transmission timing in the UL based on the timing advance (TA) that is included in the RAR, and establishes UL synchronization. Furthermore, the user terminal transmits a higher layer (L2/L3: layer 2/layer 3) control message (message 3) in the UL resource specified by the UL grant included in the RAR. This control message contains the user terminal's identifier (UE-ID). The user terminal's identifier may be, for example, a C-RNTI (Cell-Radio Network Temporary Identifier) in the event the user terminal is in RRC-connected mode, or may be a higher layer UE-ID such as an S-TMSI (System Architecture Evolution-Temporary Mobile Subscriber Identity) in the event the user terminal is in idle mode.

In response to the higher layer control message, the radio base station sends a contention-resolution message (message 4). The contention-resolution message is transmitted based on the above-mentioned user terminal identifier included in the control message. Upon successfully detecting the contention-resolution message, the user terminal transmits an HARQ (Hybrid Automatic Repeat reQuest)-based positive acknowledgment (ACK) to the radio base station. By this means, the user terminal in idle mode transitions to RRC-connected mode.

On the other hand, if the user terminal fails to detect the contention-resolution message, the user terminal judges that contention has occurred, reselects a preamble, and repeats the random access procedures from message 1 to message 4.

When learning from an ACK from the user terminal that the contention has been resolved, the radio base station transmits a UL grant to the user terminal. The user terminal starts transmitting UL data using the UL resource allocated by the UL grant.

According to the above-described contention-based random access, if the user terminal desires to transmit UL data, the user terminal can voluntarily (autonomously) start random access procedures. Also, since UL synchronization is established first and then UL data is transmitted using a UL resource that is allocated by a UL grant in a user terminal-specific manner, reliable UL transmission is made possible.

Now, future radio communication systems (for example, 5G, NR etc.) are anticipated to accommodate various services such as high-speed and large-capacity communication (eMBB), massive access (mMTC) from devices (user terminals) for inter-device communication (M2M) such as IoT and MTC, and low-latency, reliable communication (URLLC), in a single framework.

In such future radio communication systems, if the same contention-based random access as in existing LTE systems is executed before UL data is transmitted, there is a possibility that the latency time before UL data starts being transmitted will pose a problem. Also, in future radio communication systems, if, before UL data is transmitted, a request for UL resource allocation (scheduling request (SR)) from a user terminal is required, or this UL resource needs to be allocated from a radio base station (UL grant), the growth of overhead is likely to pose a problem.

For example, in massive access such as in mMTC, the frequency to transmit UL data is decreased, so that the aforementioned contention-based random access may have to be executed upon every UL data transmission opportunity. In this case, collisions of preambles between user terminals may occur more frequently, and the latency time before UL data starts being transmitted may increase. This is because, in the contention-based random access described above, when a collision of preambles occurs among a plurality of user terminals, at least one of these multiple user terminals must perform random access procedures again. There is a danger that battery consumption of user terminals due to such contention-based random access may also be a problem.

Also, in a massive access such as in mMTC, when a large amount of scheduling requests are transmitted from each user terminal or a large amount of UL grants for each user terminal are transmitted from a radio base station, the ratio of the overhead with respect to the UL data that is actually transmitted increases relatively. Therefore, in mMTC, the spectral efficiency may decrease.

Also, in services with strict requirements regarding latency time such as URLLC, when a user terminal transmits a scheduling request, a radio base station transmits a UL grant in response to the scheduling request, and the user terminal transmits UL data based on the UL grant, there is a possibility that the requirement regarding latency time cannot be fulfilled.

Therefore, in future radio communication systems, contention-based UL transmission, in which contention of UL transmission by a plurality of user terminals is permitted and UL data is transmitted without UL grants from radio base stations, is under study, for the purpose of shortening the latency time before UL data starts being transmitted and reducing the growth of overhead.

Figure 2:
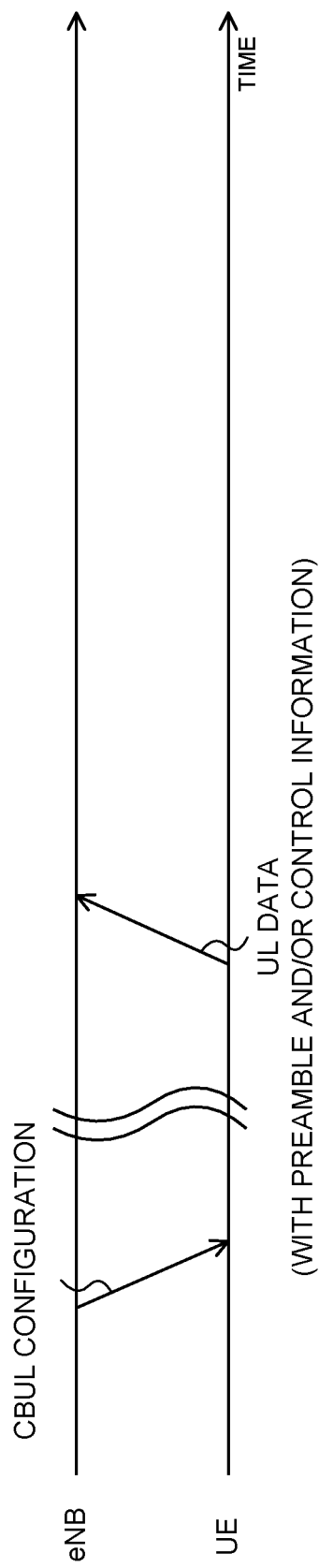
FIG. 2 is a diagram to show an example of contention-based UL transmission.

FIG. 2 is a diagram to show an example of contention-based UL transmission. Referring to FIG. 2, a user terminal may receive configuration information (CBUL configuration information) related to contention-based UL (CBUL) transmission, in advance, via system information (for example, the MIB and/or SIBs), higher layer signaling (for example, RRC signaling) and so on.

As shown in FIG. 2, the user terminal starts transmitting UL data without receiving a UL grant from the radio base station. To be more specific, when the user terminal transmits UL data at a trigger of new UL transmission, the user terminal may transmit a preamble and control information for the UL data together with the UL data. Furthermore, the user terminal may transmit the above control information and UL data without a response from the radio base station to the preamble.

Here, the preamble is used to detect UL transmission at the radio base station. By transmitting the preamble together with UL data, the radio base station can detect the UL transmission at the transmission opportunity of new UL data (preferably in a time resource before the UL data). The sequence of this preamble may be randomly selected from the multiple sequences indicated by the above CBUL configuration information. Also, the preamble may be used for channel estimation and beam search.

Furthermore, control information for UL data may include at least one of identification information of the user terminal that transmits the UL data (for example, C-RNTI, S-TMSI, etc.), information related to this UL data (for example, the amount of UL data (BSR: Buffer Status Report), the modulation scheme, the transport block size (TBS), the coding rate, etc.), information related to the capability of this user terminal, information related to the transmission resource for this UL data (for example, the index and offset of the time and frequency resource, etc.), information related to retransmission control of this UL data (for example, the HARQ process number (HPN), the redundancy version (RV), a new data indicator (NDI), etc.) and information related to the repetition of this UL data (for example, the number of repetitions, the hopping pattern, whether hopping is applied or not, etc.).

The transmission resource for transmitting at least one of the above preamble, control information and UL data may be determined based on the above CBUL configuration information. The transmission resource is at least one of a frequency resource, a time resource, a code resource, a power resource and a space resource. At least one of the preamble, control information and UL data may be orthogonal-multiplexed (for example, code-division-multiplexed) and/or non-orthogonal-multiplexed (for example, power-multiplexed or space-multiplexed) with other user terminals.

In the contention-based UL transmission shown in FIG. 2, contention of UL data from a plurality of user terminals is permitted, so that it is possible to omit messages 2 to 4 (see FIG. 1) in the contention-based random access described above, and it is possible to shorten the latency time before UL data starts being transmitted. Also, since UL data is transmitted without UL grants from the radio base station, overhead can be reduced. In addition, since scheduling requests from the user terminals, and scheduling and UL grant-related processes by the radio base station can be omitted, the latency time can also be shortened.

Note that subsequent UL data may be transmitted together with preambles and control information, or may be transmitted skipping preambles and/or control information.

In such contention-based UL transmission, it is desirable to implement a retransmission control (HARQ) scheme in the MAC (Medium Access Control) layer in order to improve spectral efficiency. Meanwhile, applying an HARQ scheme for existing LTE systems to contention-based UL transmission on an as-is basis may not enable efficient retransmission control.

For example, existing LTE systems (LTE Rel. 8 to 13) may support synchronous HARQ, in which retransmission commands and retransmission timing are determined in advance. In synchronous HARQ, retransmission command information is transmitted to the user terminal a fixed period after UL data, and this UL data is retransmitted a fixed period after the retransmission command information.

Synchronous HARQ can mitigate signaling related to retransmission control, such as signaling as to which UL data is retransmitted at which timing. In synchronous HARQ, retransmission may be commanded non-adaptively by NACKs via a retransmission control channel (PHICH: Physical Hybrid-ARQ Indicator Channel), or retransmission may be commanded adaptively by ACKs provided via a PHICH and by downlink control information (DCI) (UL grants).

In addition, in eLAA (enhanced License-Assisted Access) of LTE Rel. 14 supporting UL transmission in unlicensed bands (carriers (cells) where listening is executed prior to transmission), a study is in progress to support asynchronous HARQ, in which retransmission commands and retransmission timing are not determined in advance. In asynchronous HARQ, UL data that is retransmitted may be indicated by including at least one of the HARQ process number (HPN), the redundancy version (RV) of the UL data, and a new data indicator (NDI), which indicates whether the UL data is retransmitted or transmitted for the first time, in DCI (UL grant).

In the above-described HARQ scheme for existing LTE systems, retransmission is commanded on a per user terminal basis. Meanwhile, in the above-described contention-based UL transmission, UL data from a plurality of user terminals may be transmitted in the same UL resource (contention may occur between multiple user terminals). In this case, if retransmission commands are issued in user terminal units, retransmission command information may be transmitted to a plurality of user terminals having used the same UL resource, and this may lead to increased overhead.

Also, when an HARQ scheme for existing LTE systems is applied to the above contention-based UL transmission, it is assumed that the latency time until retransmission command information is transmitted from the radio base station becomes a problem. This is because, in half-duplex transmission (half-duplex) of time division duplex (TDD) and frequency division duplex (FDD) in existing LTE systems, UL and DL can be switched only per 1-ms transmission time interval (also referred to as "TTI," "subframe" and so on), and at least 1 ms has to be spent before retransmission command information is transmitted.

Therefore, the present inventors have studied a retransmission control scheme that is suitable for contention-based UL transmission, and arrived at the present invention. To be more specific, the present inventors have come up with the idea of reducing retransmission command-induced overhead by commanding retransmission by a unit which is different from a user terminal. Also, the present inventors have come up with the idea of shorten the latency time before retransmission command information is transmitted from the radio base station by using a TTI configuration comprised of a UL period, in which UL data is transmitted, a DL period, in which retransmission command information is transmitted and a guard period for switching between a UL period and a DL period.

Now, embodiments of the present invention will be described below in detail with reference to the accompanying drawings. Note that in contention-based UL transmission according to the present embodiment, UL data may be transmitted with a preamble and/or control information for the UL data, or UL data may be transmitted alone (see FIG. 2).

Furthermore, a transmission resource for UL data according to the present embodiment is comprised of a time resource and/or a frequency resource. The time resource is comprised of a predetermined number of time units, and the frequency resource is comprised of a predetermined number of frequency units. The time units constituting the time resource may be referred to as "symbols," "subframe spacing," "subframes," "transmission time intervals (TTIs)," "scheduling units" and so on. Furthermore, the frequency units constituting the frequency resource may be referred to as "resource blocks (PRBs)," a "resource block group (RBG)," and so on.

(First Aspect)

With a first aspect of the present invention, the unit for commanding retransmission of UL data in contention-based UL transmission will be described. In the first aspect, UL data retransmission commands (for example, ACKs (ACKnowledgment) or NACKs (Negative ACKnowledgment)) may be issued in units of frequency resources in which UL data is transmitted (the first example of retransmission commands) or may be issued in units of resource groups that include the above frequency resources (the second example of retransmission commands). Also, retransmission commands may be issued in units of one or more time resources (the third example of retransmission commands). Furthermore, retransmission commands may be issued in units of terminal groups where one or more user terminals belong (the fourth example of retransmission commands). Hereinafter, the first to fourth examples of retransmission commands will be described in detail.

First Example of Retransmission Commands

According to the first example of retransmission commands, retransmission command information to represent retransmission commands is transmitted in units of frequency resources in which UL data is transmitted. This retransmission command information may be transmitted to a user terminal using a dedicated resource, which is frequency resource-specific, or may be transmitted to the user terminal using a common resource that is common to frequency resources.

Figure 3A:
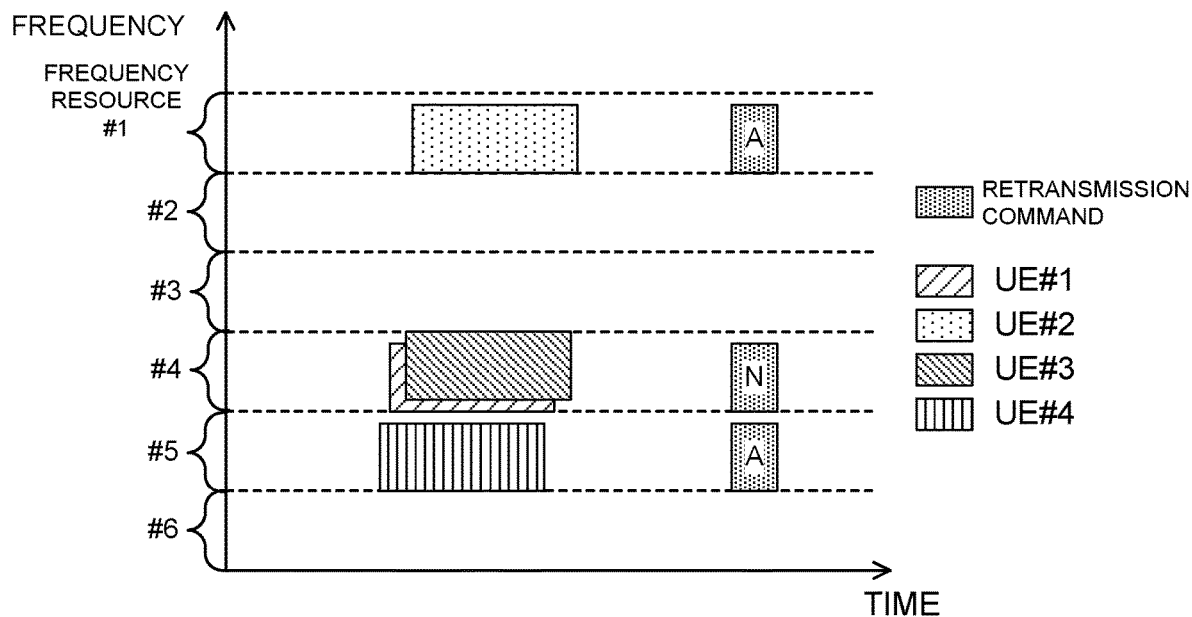
FIGS. 3A and 3B are diagrams, each showing a first example of retransmission commands according to a first aspect of the present invention.
Figure 3B:
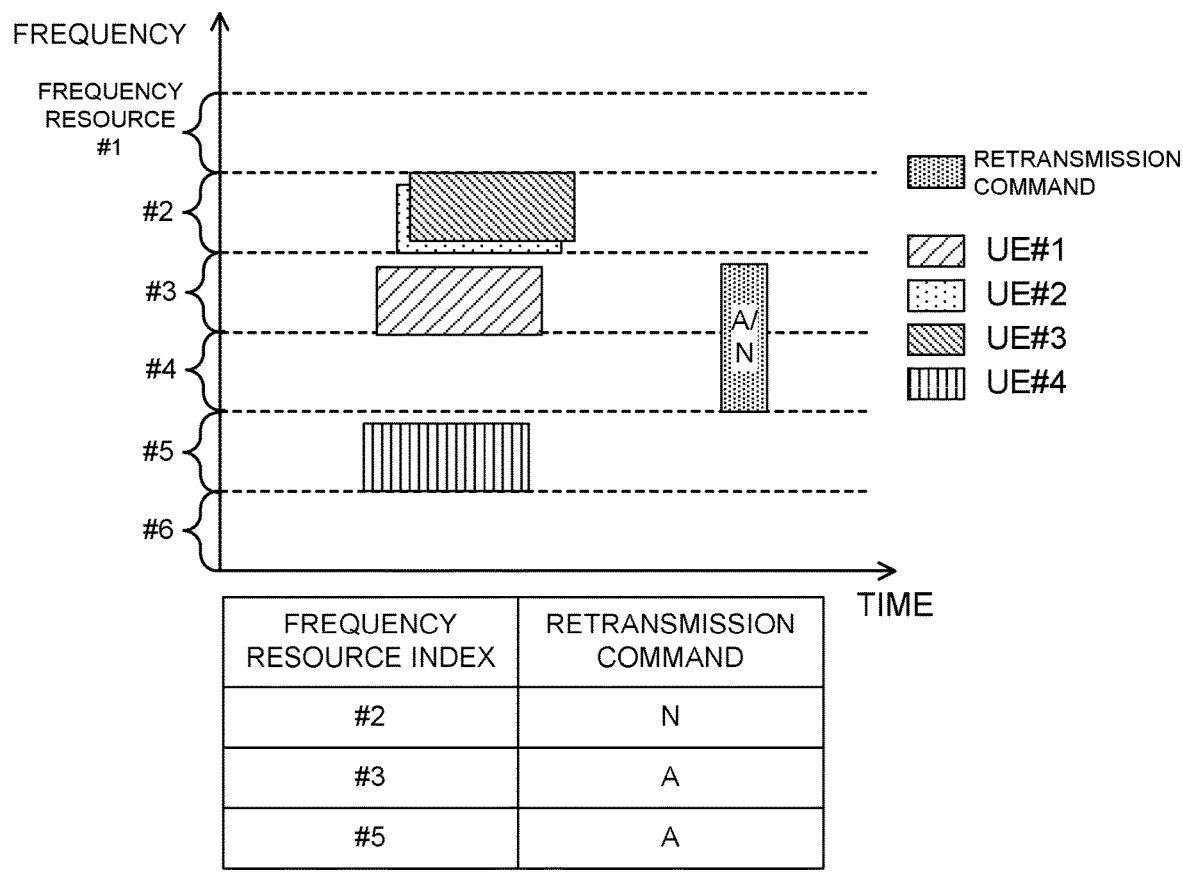

FIGS. 3A and 3B provide diagrams, each showing the first example of retransmission commands according to the first aspect. Note that in FIGS. 3A and 3B, frequency resources that can be used in contention-based UL transmission (for example, frequency resources #1 to #6 in FIGS. 3A and 3B) are pre-configured in each user terminal by means of the above-mentioned CBUL configuration information.

FIG. 3A shows an example where retransmission command information is transmitted using dedicated resources. Note that, in FIG. 3A, the same frequency resources as those of UL data are used as dedicated resources (for example, in the case of TDD and other cases), but different frequency resources may be used as well (for example, in the event of FDD, and other cases). For example, FIG. 3A assumes that user terminals #1 and #3 perform contention-based UL transmission using same frequency resource #4, and user terminals #2 and #4 perform contention-based UL transmission using different frequency resources #1 and #5, respectively.

In FIG. 3A, the radio base station successfully receives the UL data transmitted in frequency resource #1 and transmits an ACK using frequency resource #1. User terminal #2 detects an ACK that is transmitted in same frequency resource #1 as that of the UL data from user terminal #2, and learns that this UL data has been received at the radio base station. Similarly, user terminal #4 detects an ACK that is transmitted in same frequency resource #5 as that of the UL data from user terminal #4, and learns that this UL data has been received at the radio base station.

Meanwhile, since the radio base station fails to receive the UL data transmitted in frequency resource #4 due to a collision of user terminals #1 and #3, the radio base station transmits a NACK using frequency resource #4. User terminals #1 and #3 each detect a NACK, transmitted in same frequency resource #4 as UL data, and retransmits the UL data.

In FIG. 3A, the retransmission command information to represent an ACK or a NACK may be based on messages, or may be based on sequences of known patterns. By using sequences of different patterns as retransmission command information, it is possible to reduce the load of detection of ACKs or NACKs in user terminals, while improving its accuracy.

As shown in FIG. 3A, when retransmission is commanded in frequency resource units by using dedicated resources, even if user terminals #1 and #3 collide in same frequency resource #2, it suffices to transmit a single NACK in frequency resource #2, and it is not necessary to transmit two NACKs to user terminals #1 and #3. Therefore, retransmission command-induced overhead can be reduced. In addition, the use of dedicated resource makes it possible to report, implicitly, in which frequency resource the UL data addressed by the retransmission command has been transmitted.

FIG. 3B shows an example in which retransmission command information is transmitted using common resources. Note that in FIG. 3B, specific frequency resources (#3 and #4) of the same carrier (CC, cell, and/or the like) as that of UL data are used as common resources (for example, in the case of TDD and other cases), but specific frequency resources of a different carrier from that of UL data may be used as well (for example, in the case of FDD and other cases). For example, FIG. 3B assumes that user terminals #2 and #3 perform contention-based UL transmission using same frequency resource #2, and user terminals #1 and #4 perform contention-based UL transmission using different frequency resources #3 and #5, respectively.

In FIG. 3B, the radio base station fails to receive the UL data transmitted in frequency resource #2, and successfully receives the UL data transmitted in frequency resources #3 and #5. Therefore, the radio base station transmits retransmission command information, in which frequency resource #2 and a NACK, frequency resource #3 and an ACK and frequency resource #5 and an ACK are shown to be associated with each other, by using common resources.

User terminals #1 and #4 each receive this retransmission command information in common resources, and detect the ACKs associated with frequency resources #3 and #5. Furthermore, user terminals #2 and #3 receive the retransmission command information in common resources, and detect the NACK associated with frequency resource #4. User terminals #2 and #3 retransmit the UL data based on the detected NACK.

Thus, retransmission command information that is transmitted in a common resource may indicate a retransmission command (ACK or NACK) in association with the frequency resource (index). Furthermore, this retransmission command information may be transmitted as, for example, common control information that is to be detected (blind-decoded) in a common search space in a DL control channel (PDCCH (Physical Downlink Control CHannel) or EPDCCH (Enhanced Physical Downlink Control CHannel)).

As shown in FIG. 3B, when retransmission command information representing retransmission commands associated with frequency resources is transmitted using common resources, the overhead can be reduced compared to when retransmission commands are provided in user terminal units. Furthermore, the user terminal has only to perform the process for detecting retransmission command information in specific frequency resources, regardless of in which frequency resources UL data has been transmitted, the load of detecting retransmission commands in the user terminal can be reduced.

In FIGS. 3A and 3B, frequency resources and/or time resources for use for retransmitting UL data may be autonomously selected on the user terminal side, or may be indicated by retransmission command information from the radio base station. Furthermore, at least one of the modulation scheme, the coding scheme, the transport block size, the redundancy version and the transmission power used to retransmit this UL data may be autonomously controlled on the user terminal side, or may be controlled based on retransmission command information from the radio base station.

Second Example of Retransmission Commands

According to a second example of retransmission commands, retransmission command information, which represents retransmission commands in units of resource groups containing UL data-transmitting frequency resources, is transmitted. This retransmission command information may be transmitted to a user terminal using a dedicated resource, which is resource group-specific, or may be transmitted to the user terminal using a common resource that is common to resource groups.

Figure 4A:
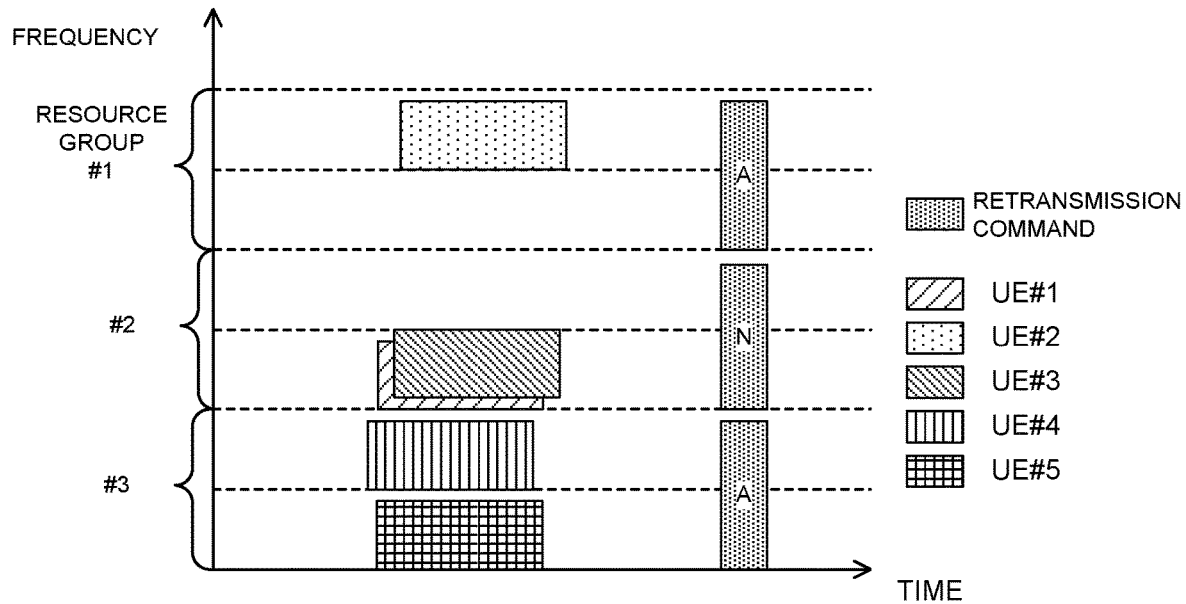
FIGS. 4A and 4B are diagrams, each showing a second example of retransmission commands according to the first aspect.
Figure 4B:
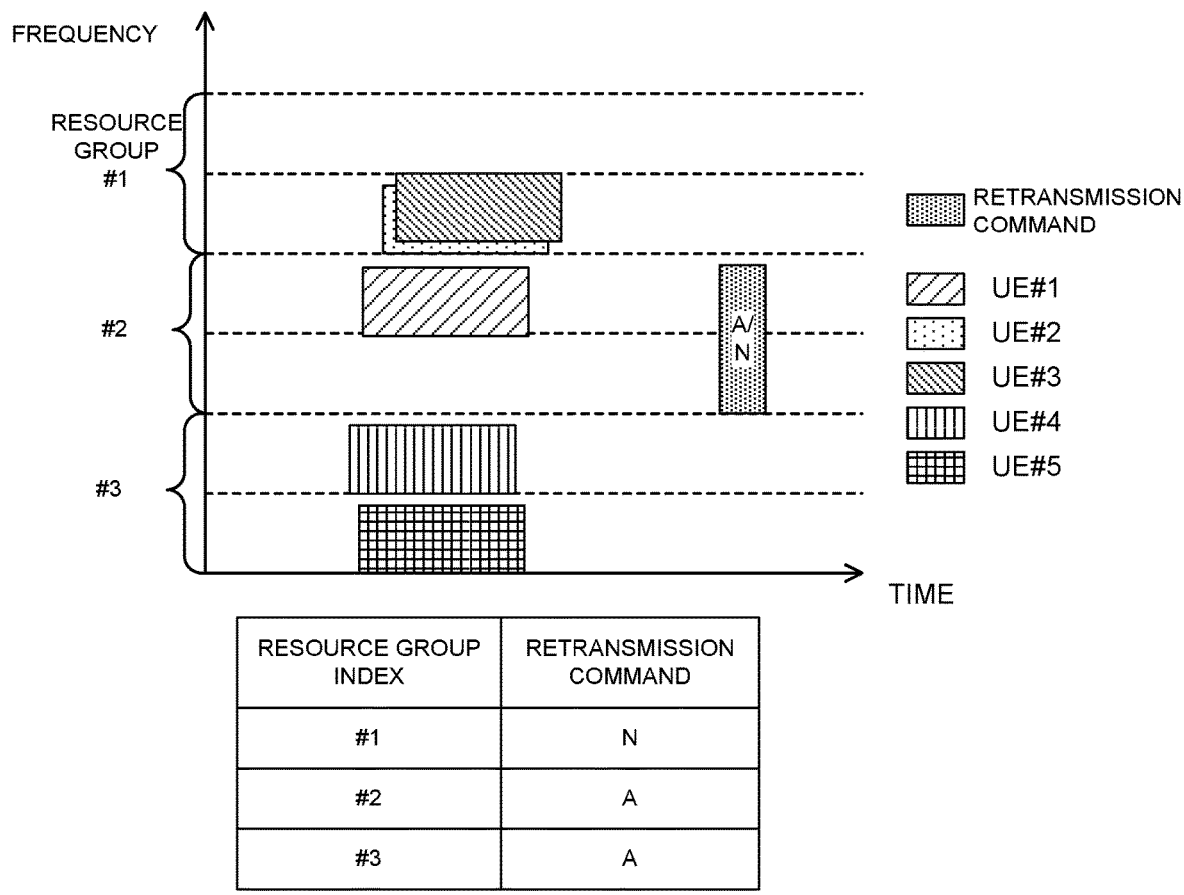

FIGS. 4A and 4B provide diagrams, each showing the second example of retransmission commands according to the first aspect. Note that the second example of retransmission commands will be described, primarily focusing on differences from the first example of retransmission commands. In FIGS. 4A and 4B, resource groups that can be used in contention-based UL transmission (for example, resource groups #1 to #3 in FIGS. 4A and 4B), are pre-configured in each user terminal by means of the above-mentioned CBUL configuration information. Each resource group is comprised of a predetermined number of frequency resources.

FIG. 4A shows an example where retransmission command information is transmitted using dedicated resources. In FIG. 4A, as dedicated resources, the same resource group as the resource group including the frequency resource where UL data is transmitted is used (for example, in the case of TDD and other cases), but different frequency resources may be used (for example, in the case of FDD and other cases).

For example, FIG. 4A assumes that user terminals #1 and #3 perform contention-based UL transmission using same frequency resource in resource group #2, user terminal #2 performs contention-based UL transmission using a frequency resource in resource group #1, and user terminals #4 and #5 perform contention-based UL transmission using different frequency resources in resource group #3.

In FIG. 4A, since the radio base station successfully receives the UL data transmitted in the frequency resource of resource group #1, the radio base station transmits an ACK using resource group #1. User terminal #2 detects the ACK transmitted in resource group #1, and learns that the UL data from user terminal #2 has been received at the radio base station.

Meanwhile, since the radio base station fails to receive the UL data transmitted in resource group #2 due to a collision of user terminals #1 and #3, the radio base station transmits a NACK using resource group #2. User terminals #1 and #3 each detect the NACK transmitted in resource group #2 and retransmit the UL data.

Furthermore, since the radio base station successfully receives the UL data transmitted in different frequency resources of resource group #3, the radio base station transmits an ACK using resource group #3. User terminals #4 and #5 detect the ACK transmitted in resource group #3, and learn that the UL data from user terminals #4 and #5 has been received at the radio base station.

In FIG. 4A, the retransmission command information to represent an ACK or a NACK may be based on messages, or may be based on sequences of known patterns. By using sequences of different patterns as retransmission command information, it is possible to reduce the load of detection of ACKs or NACKs in user terminals, while improving its accuracy.

As shown in FIG. 4A, when retransmission commands are issued in resource group units by using dedicated resources, the retransmission command-induced overhead can be reduced compared to when retransmission commands are issued in frequency resource units. In addition, the use of dedicated resource makes it possible to report, implicitly, in which resource group the UL data addressed by the retransmission command has been transmitted.

FIG. 4B shows an example where retransmission command information is transmitted using common resources. Note that, in FIG. 4B, a specific resource group (#2) of the same carrier (CC, cell, and/or the like) as that of UL data is used as common resources (for example, in the case of TDD and other cases), a specific resource group of a different carrier from that of UL data may be used as well (for example, in the case of FDD and other cases). Also, as common resources, all of the frequency resources in a specific resource group may be used, or part of frequency resources may be used.

For example, FIG. 4B assumes that user terminals #2 and #3 perform contention-based UL transmission using the same frequency resource in resource group #1, user terminal #1 performs contention-based UL transmission using a frequency resource in resource group #2, and user terminals #4 and #5 perform contention-based UL transmission using different frequency resources in resource group #3.

In FIG. 4B, the radio base station fails to receive the UL data transmitted in resource group #1, and successfully receives the UL data transmitted in resource groups #2 and #3. Therefore, the radio base station transmits retransmission command information, which shows resource group #1 and a NACK, resource group #2 and an ACK and resource group #3 and an ACK, in association with each other, by using common resources.

User terminal #1 receives the above retransmission command information in common resources, and detects the ACK associated with resource group #2 in which UL data has been transmitted. Likewise, user terminals 4 and #5 each receive the above retransmission command information in common resources, and detect the ACK associated with resource group #3 in which UL data has been transmitted. Meanwhile, user terminals #2 and #3 receive the retransmission command information in common resources, and detect the NACK associated with resource group #1 in which UL data has been transmitted. User terminals #2 and #3 retransmit the UL data based on this NACK.

Thus, the retransmission command information to be transmitted in common resources may represent retransmission commands (ACK or NACK) in association with resource groups (indices). Furthermore, this retransmission command information may be, for example, transmitted as common control information to be detected (blind decoded) in a common search space in a DL control channel (PDCCH or EPDCCH).

As shown in FIG. 4B, when retransmission command information that represents retransmission commands associated with resource groups is transmitted using common resources, it is possible to reduce the overhead compared to when retransmission commands are issued in units of user terminals or frequency resources. Also, the user terminal has only to perform the process of detecting retransmission command information in at least part of the frequency resources in a specific resource group, regardless of in which resource group the user terminal has transmitted UL data, so that the load of detection of retransmission commands in the user terminal can be reduced.

Note that, in FIGS. 4A and 4B, the resource groups and/or the time resources that are used to retransmit UL data may be autonomously selected on the user terminal side, or may be indicated by means of retransmission command information from the radio base station. Furthermore, at least one of the modulation scheme, the coding scheme, the transport block size, the redundancy version and the transmission power used to retransmit the UL data may be controlled autonomously on the user terminal side, or may be controlled based on retransmission command information from the radio base station.

Third Example of Retransmission Commands

With the first and second examples of retransmission commands, the unit of retransmission commands in the frequency direction has been described. Now, with a third example of retransmission commands, the retransmission command unit in the time direction will be described. According to the third example of retransmission commands, retransmission command information to represent retransmission commands in units of one or more time resources are transmitted. With this retransmission command information, one or more time resources that are addressed by retransmission commands may be reported implicitly, or may be reported explicitly.

Figure 5A:
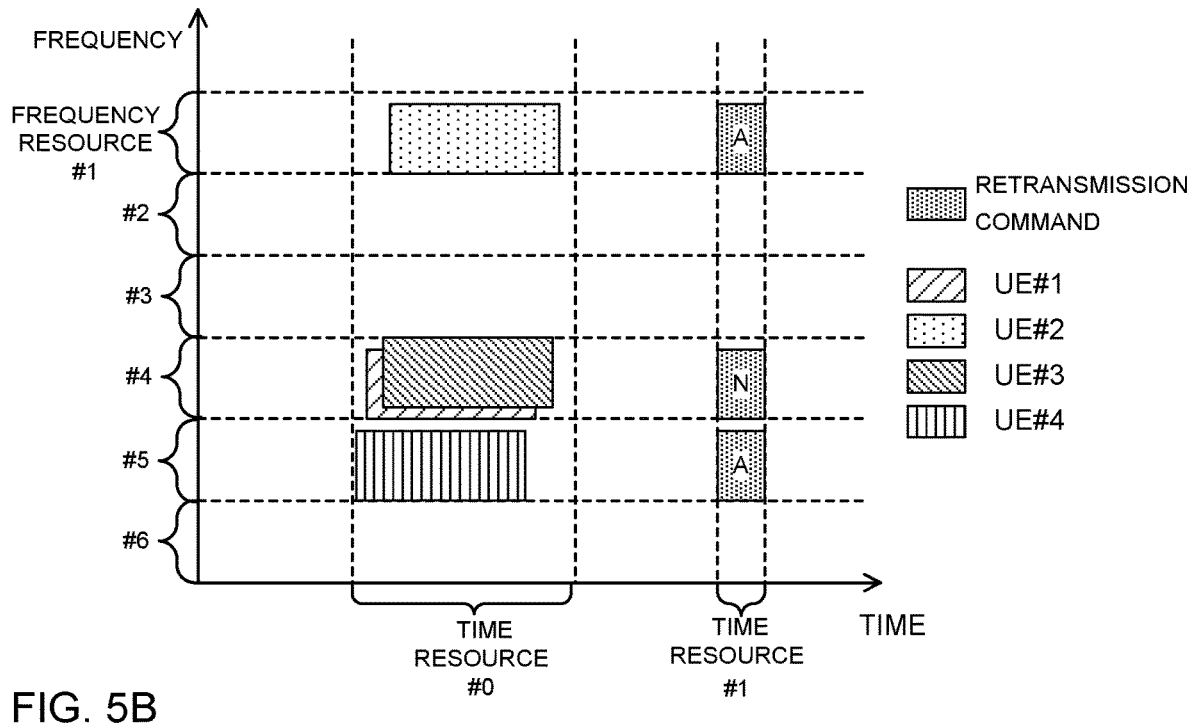
FIGS. 5A and 5B are diagrams, each showing a third example of retransmission commands according to the first aspect.
Figure 5B:
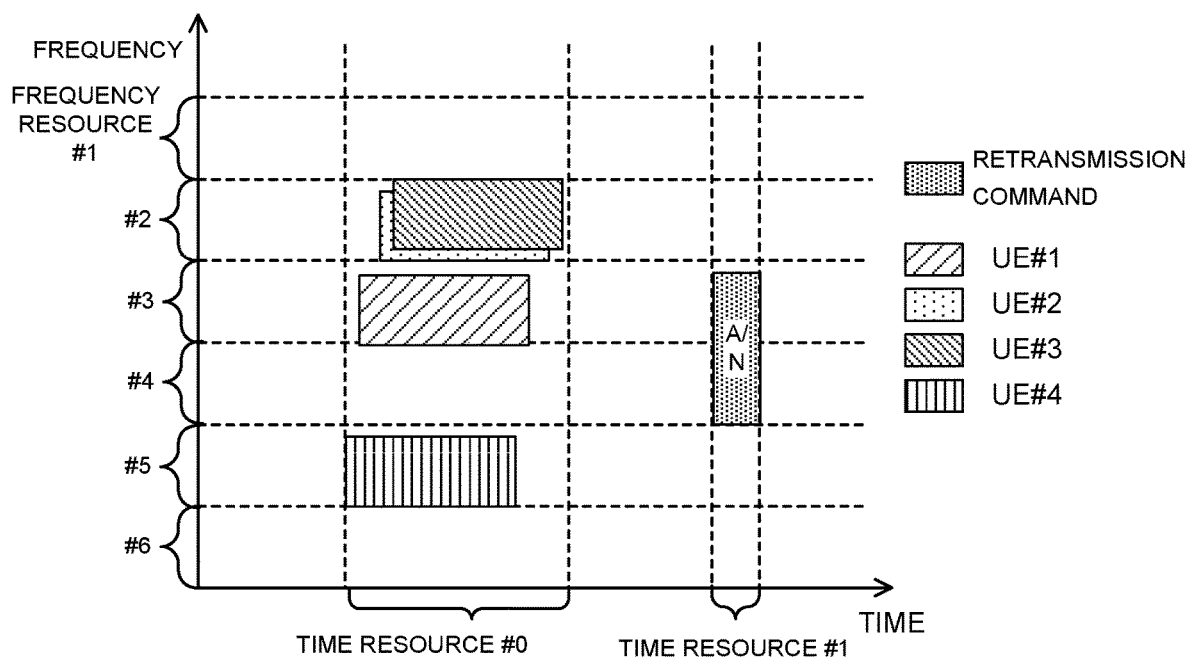

FIGS. 5A and 5B provide diagrams, each showing the third example of retransmission commands according to the first aspect. Note that, although, in the following description, differences from FIGS. 3A and 3B will be primarily described, the control of retransmission commands in the time direction, which will be described below, can be combined with either retransmission commands in frequency resource units (the first example of retransmission commands) or retransmission commands in resource block units (the second example of retransmission commands). Furthermore, although FIG. 5A shows a case where a retransmission command addresses one time resource (#0), a retransmission command may address a plurality of time resources.

FIG. 5A shows an example in which time resources are reported implicitly. As shown in FIG. 5A, retransmission command information is transmitted in time resource #1 (for example, a predetermined DL symbol), which comes a predetermined period of time after resource #0, so as to implicitly report that the UL data transmitted in time resource #0 is the target of the retransmission command. Note that, although, in FIG. 5A, a retransmission command is transmitted in the same frequency resources as that of UL data, this is by no means limiting.

Also, referring to FIG. 5A, the fact that the UL data transmitted in time resource #0 is addressed by a retransmission command may be reported implicitly by the sequence pattern of the retransmission command information, instead of time resource #1. For example, the sequence pattern of retransmission command information may be change per time resource that is addressed by a retransmission command.

FIG. 5B shows an example where time resources are reported explicitly. As shown in FIG. 5B, retransmission command information that represents retransmission commands associated with frequency resources (indices) and time resources (indices) may be transmitted. Note that, although FIG. 5B shows only a single time resource #0, a retransmission command may specify multiple time resources as targets. By reporting the time resources addressed by retransmission commands explicitly, it is possible to transmit retransmission commands for one or more time resource more adequately.

Also, although FIG. 5B shows retransmission commands that are associated with time resources (indices), it is equally possible to use retransmission command information that represents retransmission commands associated with offsets for time resources (indices) (for example, the offset between time resources #0 and #1).

As shown in FIGS. 5A and 5B, by enabling control of the unit of retransmission commands not only in the frequency direction but also in the time direction, it is possible to command retransmission adequately when time resources for contention-based UL transmission are allocated either continuously or discontinuously.

Fourth Example of Retransmission Commands

With a fourth example of retransmission commands, retransmission commands in units of terminal groups, where one or more user terminals belong, will be described. The fourth example of retransmission commands may be combined with at least one of the first to third examples of retransmission commands, or may be used alone.

Figure 6A:
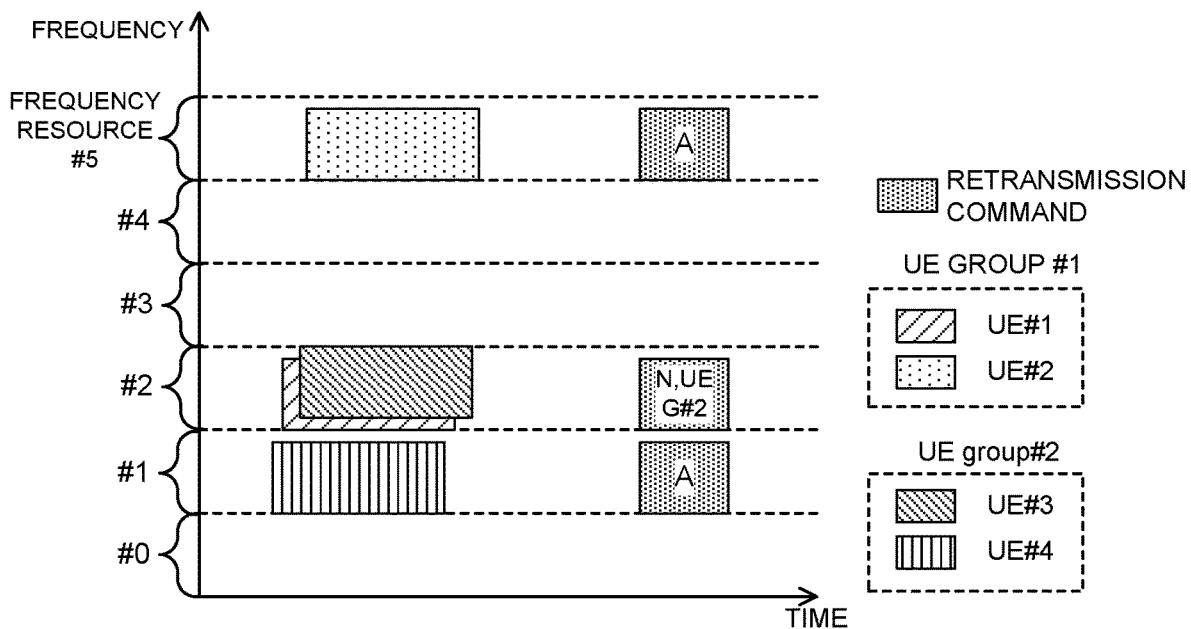
FIGS. 6A and 6B are diagrams, each showing a fourth example of retransmission commands according to the first aspect.
Figure 6B:
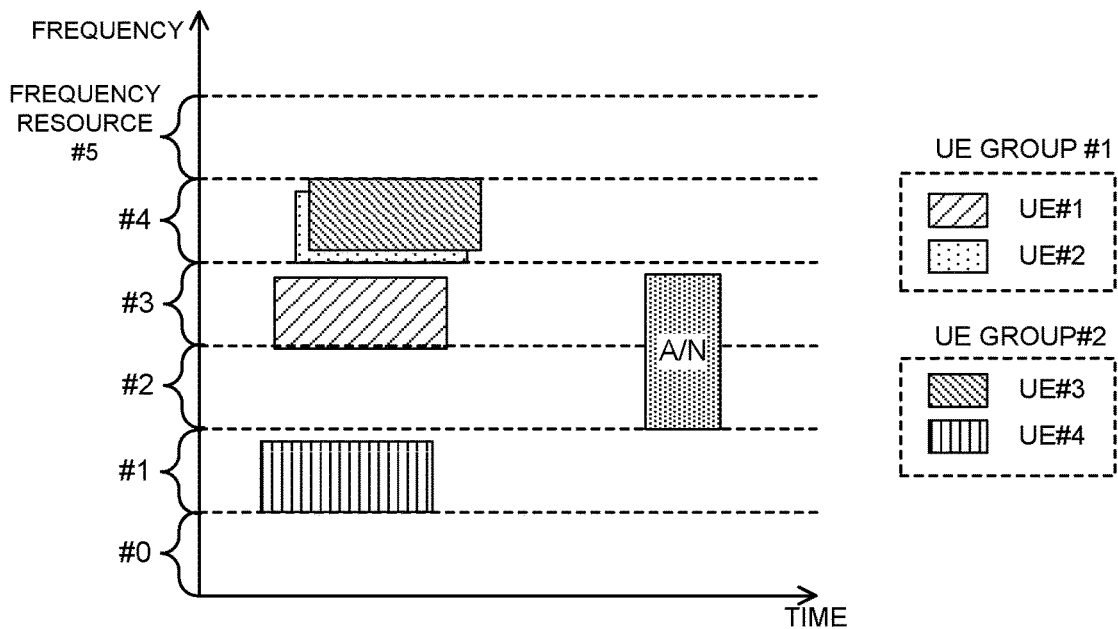

FIGS. 6A and 6B provide diagrams, each showing the fourth example of retransmission commands according to the first aspect. Note that, although differences from FIG. 1 will be primarily described below, the control of retransmission commands in terminal group units which will be described below is not limited to retransmission commands in frequency resource units (the first example of retransmission commands), and can be combined with retransmission commands in resource block units (the second example of retransmission commands) and can also be combined with retransmission commands in units of one or more time resources (the third example of retransmission commands).

FIG. 6A shows an example of retransmission commands in unit of terminal groups (also referred to as "UE groups," "UEGs," etc.). In FIG. 6A, user terminal #1 of terminal group #1 and user terminal #3 of terminal group #2 transmit UL data together with the terminal group-specific preambles, using same frequency resource #2, so that, even if a plurality of preambles collide, the radio base station can sufficiently detect each preamble.

In FIG. 6A, the radio base station detects the preamble of user terminal group #1 in frequency resource #2, and receives the UL data of user terminal group #1. In this case, the radio base station may transmit a NACK, which is associated with user terminal group #2 whose UL data the radio base station could not receive, by using frequency resource #2.

User terminal #3 that has transmitted UL data using frequency resource #2 detects the NACK associated with terminal group #2 where user terminal #3 itself belongs, and retransmits the UL data based on this NACK. Meanwhile, user terminal #1 that has transmitted UL data using frequency resource #2 does not detect a NACK that is associated with user terminal group #1 where user terminal #1 itself belongs, so that user terminal #1 can learn that the UL data has been received at the radio base station.

Note that, in FIG. 6A, an ACK that is associated with a user terminal group may be transmitted. For example, when user terminal #4 transmits UL data with the preamble of terminal group #2, using frequency resource #1, the radio base station may associate an ACK transmitted in frequency resource #1 with terminal group #2, and transmit this.

Furthermore, in FIG. 6A, sequences of varying patterns may be used, on a per terminal group basis, as an ACK or a NACK. By this means, the accuracy of detection of terminal groups in user terminals can be improved.

FIG. 6B shows another example of retransmission commands in terminal group units. As shown in FIG. 6B, when retransmission command information is transmitted using common resources, this retransmission command information may show frequency resources (indices), terminal groups (indices) and retransmission commands, in association with each other.

In FIG. 6B, when the radio base station fails to receive UL data in frequency resource #4, the radio base station may transmit retransmission command information which associates frequency resource #4, all terminal groups and a NACK. In this way, even if the radio base station fails to detect a preamble in frequency resource #4, retransmission can be commanded appropriately.

According to the fourth example of retransmission commands, retransmission commands are issued in terminal group units, so that the overhead can be reduced compared to when retransmission commands are issued on a per user terminal basis. Also, by combining the fourth example of retransmission commands with the frequency-wise retransmission commands according to the first example of retransmission commands, even when a collision of UL data occurs, only the UL data of terminal groups which the radio base station fails to receive needs to be retransmitted, so that the spectral efficiency can be improved.

(Second Aspect)

With a second aspect of the present invention, TTI configurations for contention-based UL transmission will be described. Note that the second aspect may be combined with the first aspect, or may be used alone. Here, a TTI may be the time unit to serve as the unit in scheduling, and may be referred to as a "subframe," "subframe spacing," "scheduling unit," and so on.

In the second aspect, the TTI for contention-based UL transmission is comprised of a UL period, which is used to transmit UL data, a DL period, which is used for retransmission command information, and a guard period, which is used to switch the UL period and the DL period.

Figure 7:
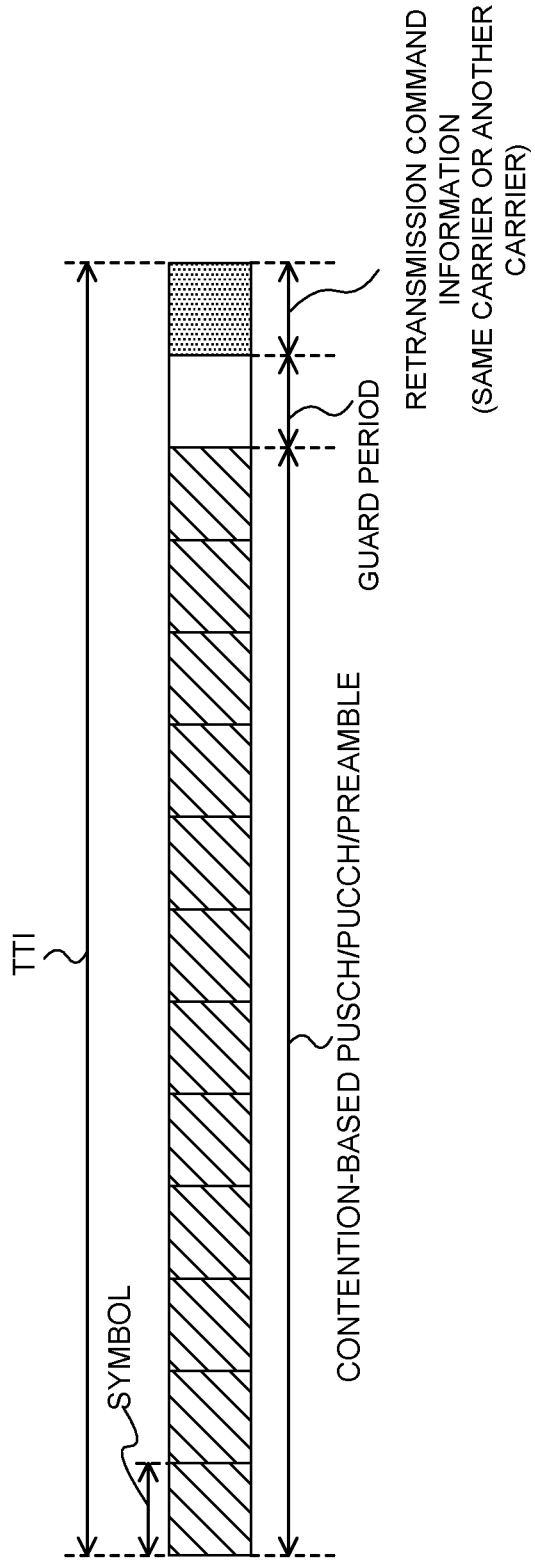
FIG. 7 is a diagram to show a first example of a TTI configuration for contention-based UL transmission according to a second aspect of the present invention.

FIG. 7 is a diagram to show a first example of a TTI configuration for contention-based UL transmission according to the second aspect. As shown in FIG. 7, in the TTI for contention-based UL transmission, a guard period may be provided following a UL period for UL data, and a DL period for retransmission command information may be provided following the guard period. In this UL period, UL data is transmitted via a UL data channel (for example, a PUSCH (Physical Uplink Shared CHannel)). Also, in the UL period, in addition to this UL data, preambles may be transmitted via an access channel and/or UL data control information may be transmitted via a UL control channel (for example, a PUCCH (Physical Uplink Control CHannel)).

For example, in FIG. 7, the last two symbols in the TTI are configured as a guard period and a DL period. In this guard period and the DL period, UL data cannot be transmitted (blanking of UL data). So, these guard period and DL period are also referred to as "blanking periods."

Figure 8:
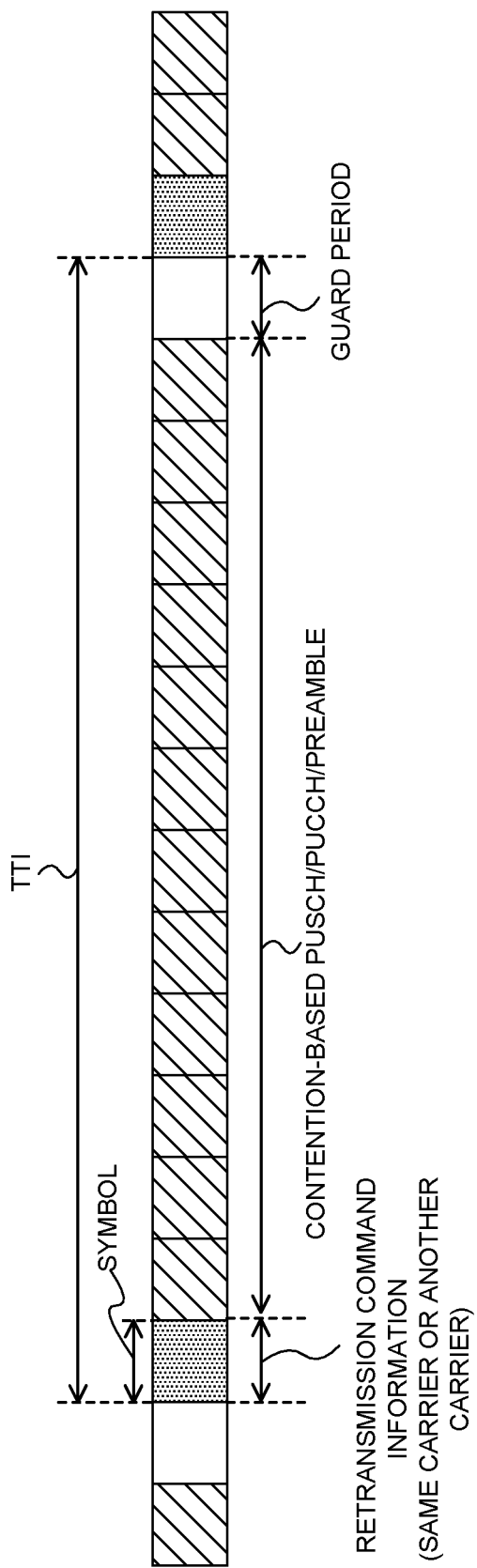
FIG. 8 is a diagram to show a second example of a TTI configuration for contention-based UL transmission according to the second aspect.

FIG. 8 is a diagram to show a second example of a TTI configuration for contention-based UL transmission according to the second aspect. As shown in FIG. 8, in this TTI for contention-based UL transmission, a UL period for UL data may be provided following a DL period for retransmission command information, and, following this UL period, a guard period may be provided. As described above, in this UL period, in addition to UL data, preambles and/or UL data control information may be transmitted.

For example, in FIG. 8, the first symbol in the TTI is configured as a DL period for retransmission command information for the UL data transmitted in the previous TTI. In addition, the last symbol of this TTI is configured as a guard period.

Note that, although, in FIG. 7 and FIG. 8, a UL period for UL data is provided following a DL period for retransmission command information, a guard period for switching DL and UL may be provided between these DL period and UL period. Furthermore, the guard period is not limited to being one symbol, and may be a predetermined period of time.

In FIG. 7 and FIG. 8, the retransmission command information may be transmitted in the same carrier (CC, cell, and/or the like) as that of UL data (for example, in the case of flexible duplex of TDD or FDD), or may be transmitted in a different carrier (for example, in the case of FDD where flexible duplex does not apply). Note that, when FDD half-duplex is adopted in MTC terminals and others, blanking periods may be configured so that UL transmission is not performed during DL reception.

Furthermore, in FIG. 7 and FIG. 8, blanking of UL data may be provided, in the guard period and in the DL period (blanking period), by way of rate matching or by way of puncturing). When rate matching is used, the transport block size (TBS) is changed depending on the amount of UL data resources within the TTI. Meanwhile, when puncturing is used, the TBS is not changed.

According to the second aspect of the present invention, the TTI for contention-based UL transmission is comprised of a UL period for UL data, a DL period for retransmission command information, and a guard period, so that the latency time until retransmission command information is transmitted can be shortened. Also, by shortening the DL period for retransmission command information (down to one symbol, for example), the overhead can be reduced. In addition, according to the second aspect, the retransmission command information described in the first aspect may be transmitted. In this case, even if the DL period is shortened, robust retransmission commands can be provided.

Note that, with the second aspect, whether or not to use the TTI configuration including a UL period for UL data, a DL period for retransmission command information and a guard period may be configured in the user terminal by system information or by higher layer signaling.

In addition, information to indicate the DL period for retransmission command information (for example, the proportion of the DL period in the TTI duration, or the number of symbols for the DL period), may be configured in the user terminal via system information or higher layer signaling. This is because the number of bits and/or the amount of resources required for retransmission command information varies depending on the degree of congestion, the frequency of collisions, and the like.

Note that the information to indicate the DL period for retransmission command information is not limited to the above proportion or the number of symbols in the DL period, and may be the number of symbols in blanking periods. When the number of symbols in blanking periods is configured by system information or higher layer signaling, the DL period for retransmission command information may be determined (calculated) based on a guard period of a fixed length, or determined (calculated) based on a guard period that is configured via system information or higher layer signaling.

(Third Aspect)

With a third aspect of the present invention, default retransmission commands will be described. The third aspect may be used in combination with at least one of the first and second aspects, or may be used alone.

In contention-based UL transmission, UL data is transmitted without UL grants from a radio base station, meaning that there is no assumption that detection of UL grants may fail (DTX). Therefore, the user terminal has only to be able to detect whether or not the radio base station has been successful in receiving UL data (based on, for example, an ACK or a NACK). Therefore, with the third aspect, a default retransmission command is defined, and transmission of retransmission command information that represents the default retransmission command is omitted, so that the overhead and latency time associated with retransmission commands can be reduced.

According to the third aspect, either an ACK or a NACK is defined as the default retransmission command. The retransmission command information that has been described above with the first and second aspects may be transmitted to user terminals if the retransmission command information indicates a different retransmission command than the default retransmission command.

Figure 9A:
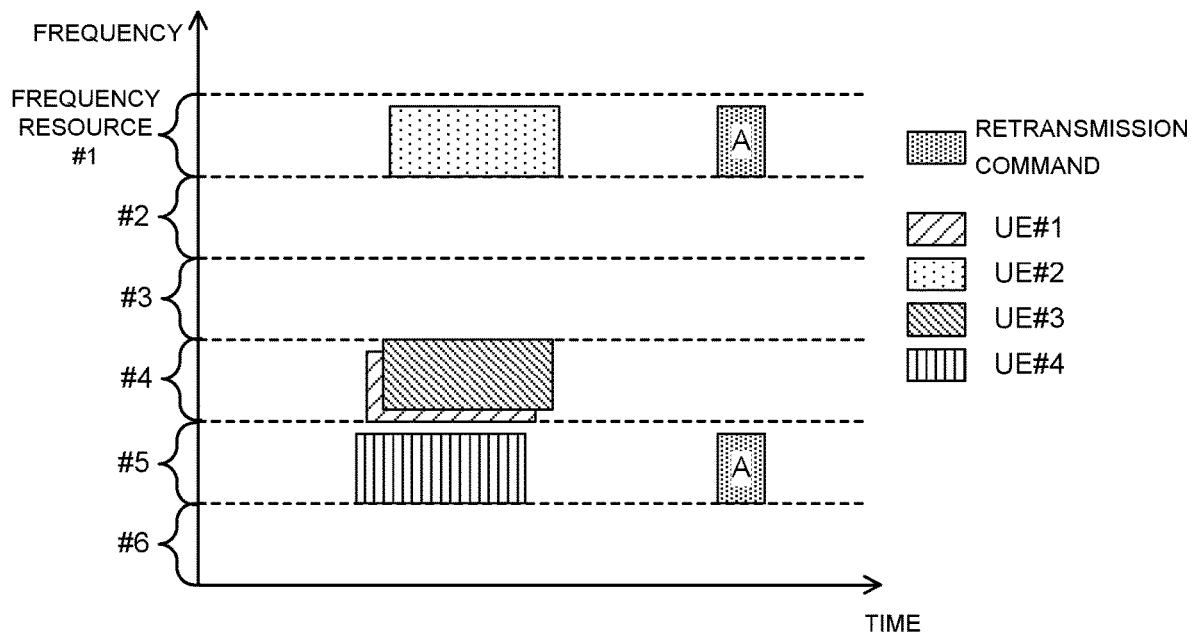
FIGS. 9A and 9B are diagrams to show examples of retransmission commands according to a third aspect of the present invention.
Figure 9B:
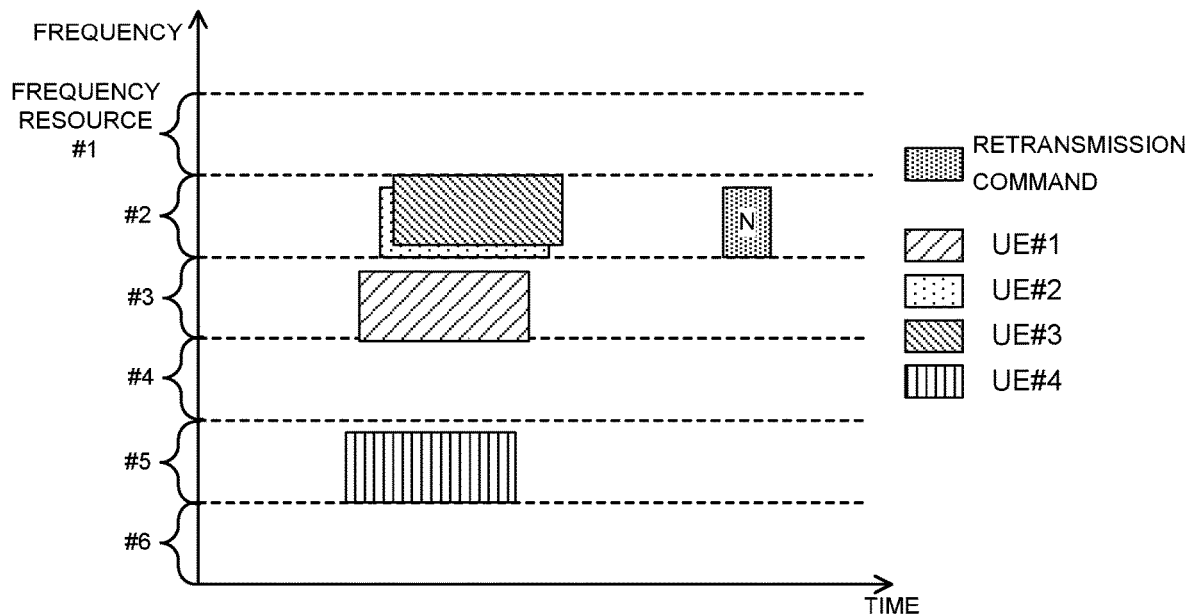

FIGS. 9A and 9B provide diagrams to show examples of retransmission commands according to the third aspect. Note that, although differences from FIG. 3 will be primarily described below, the control related to default retransmission commands, which will be described below, can be combined with either retransmission commands in frequency resource units (the first example of retransmission commands) or retransmission commands in resource block units (the second example of retransmission commands). Furthermore, the control related to default retransmission commands described below can be combined with retransmission commands in units of one or more time resources (the third example of retransmission commands), and/or retransmission commands in units of terminal groups (the fourth example of retransmission commands).

FIG. 9A shows an example where a NACK is the default retransmission command. As shown in FIG. 9A, when a NACK is the default retransmission command, retransmission command information to represent an ACK may be sent to the user terminal using a predetermined resource (the above-described dedicated resource or common resource).

In this case, retransmission command information to represent a NACK is not transmitted.

FIG. 9B shows an example where an ACK is the default retransmission command. As shown in FIG. 9B, if an ACK is the default retransmission command, retransmission command information to represent a NACK may be sent to the user terminal using a predetermined resource (the above-described dedicated resource or common resource). In this case, retransmission command information to represent an ACK is not transmitted.

In addition, according to the third aspect, the default retransmission command (ACK or NACK) may be configured in the user terminal via system information or higher layer signaling. This is to alleviate the overhead associated with retransmission commands depending on the degree of congestion, the frequency of collisions and others.

Also, with the third aspect, whether or not the default retransmission command issued may be configured in the user terminal via system information or higher layer signaling. This is because if configuration for not using a default retransmission command is adopted (that is, when, only after an ACK or a NACK is detected, can the next UL data be transmitted for the first time, or can UL data be retransmitted), erroneous transmission (erroneous retransmission) of UL data due to failure of ACK or NACK detection can be prevented.

Also, in the third aspect, when a default retransmission command (ACK or NACK) is used, the user terminal may transmit information indicating whether UL data is new data or retransmission data (for example, NDI), as UL data control information. As a result, even when transmission of retransmission command information to represent the default retransmission command is omitted, it is possible to lower the risk of misrecognition produced between radio base stations and user terminals.

Furthermore, the user terminal may transmit at least one piece of information that is included in UL grants such as the redundancy version (RV), the modulation scheme, the coding rate, the transport block size, the resource for transmitting UL data, information related to spatial multiplexing (for example, the number of layers in MIMO (Multiple-Input and Multiple-Output)), information related to power multiplexing (for example, transmission power) and so on, as UL data control information.

Furthermore, the above-noted UL data control information may be transmitted via a UL control channel (PUCCH) or may be transmitted via a UL shared channel (PUSCH). To be more specific, this control information may be transmitted using the PUCCH constituting the transmission format for contention-based UL transmission, or may be multiplexed with UL data and transmitted using the PUSCH constituting this transmission format.

In the third aspect, since transmission of retransmission command information that represents the default retransmission command is omitted, the overhead associated with retransmission commands can be reduced. In addition, the latency time due to retransmission command can be reduced. Also, since the user terminal does not need to detect the default retransmission, the load of detection can be reduced.

(Fourth Aspect)

With a fourth aspect of the present invention, redundancy versions (RV) that are applied to UL data retransmitted based on retransmission command information will be described. The fourth aspect may be used in combination with at least one of the first to third aspects, or may be used alone.

Figure 10A:
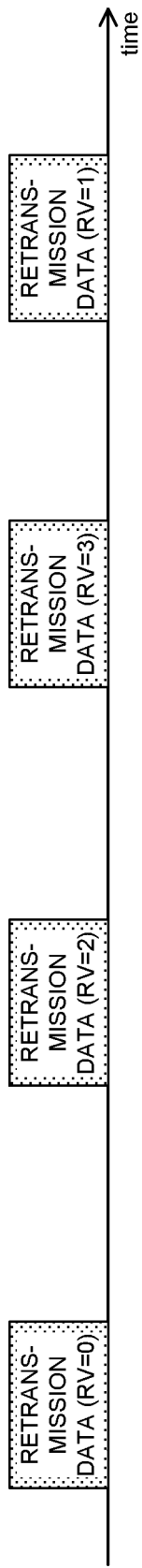
FIGS. 10A, 10B, and 10C are diagrams to show examples of applying redundancy versions according to a fourth aspect of the present invention.
Figure 10B:
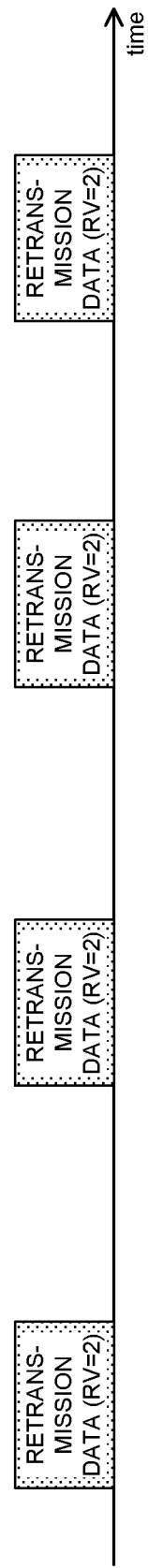
Figure 10C:
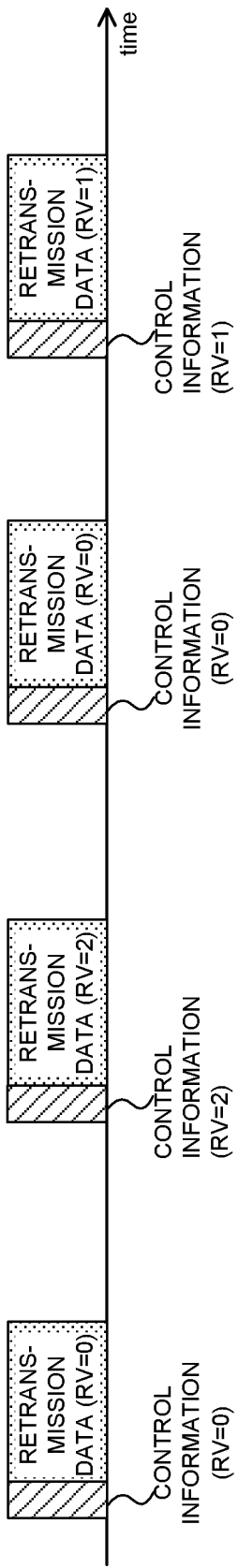

FIGS. 10A, 10B, and 10C provide diagrams, each showing an example of applying redundancy versions according to the fourth aspect. As shown in FIG. 10A, when retransmitting UL data of the same HPN, the user terminal may switch the redundancy version following predetermined rules. For example, in FIG. 10A, every time UL data of the same HPN is retransmitted, the redundancy version is switched in the order of 0, 2, 3, and 1. As shown in FIG. 10A, when the redundancy version is switched following a predetermined rule, incremental redundancy (IR) gain can be achieved.

Alternatively, as shown in FIG. 10B, when retransmitting UL data of the same HPN, the user terminal may apply a fixed redundancy version. For example, in FIG. 10B, every time UL data of the same HPN is retransmitted, the same redundancy version 2 is applied. As shown in FIG. 10B, when a fixed redundancy version is used, it is possible to prevent blind detection for the redundancy version from taking place in the radio base station.

Alternatively, every time UL data of the same HPN is retransmitted, the user terminal may select a redundancy version and report the selected redundancy version to the radio base station. This redundancy version (1) may be reported explicitly, or (2) may be reported implicitly.

(1) When this selected redundancy version is reported explicitly, as shown in FIG. 10C, the user terminal transmits information to represent the selected redundancy version, as UL data control information, to the radio base station. In this case, in addition to achieving IR gain, it is possible to prevent blind detection for the redundancy version from taking place in the radio base station. This control information may be transmitted using the PUCCH constituting the transmission format for contention-based UL transmission, or may be multiplexed with UL data and transmitted using the PUSCH constituting this transmission format.

(2) When the selected redundancy version is reported implicitly, the user terminal may retransmit UL data by using different reference signal sequences (for example, demodulation reference signal (DM-RS: Demodulation Reference Signal) sequences) per redundancy version, or by using different cyclic shift (CS) patterns per redundancy version. In this case, the growth of overhead accompanying reporting of the redundancy version can be prevented.

(Radio Communication System)

Now, the structure of a radio communication system according to the present embodiment will be described below. In this radio communication system, each radio communication method according to the above-described embodiments is employed. Note that the radio communication method according to each embodiment may be used alone or may be used in combination.

Figure 11:
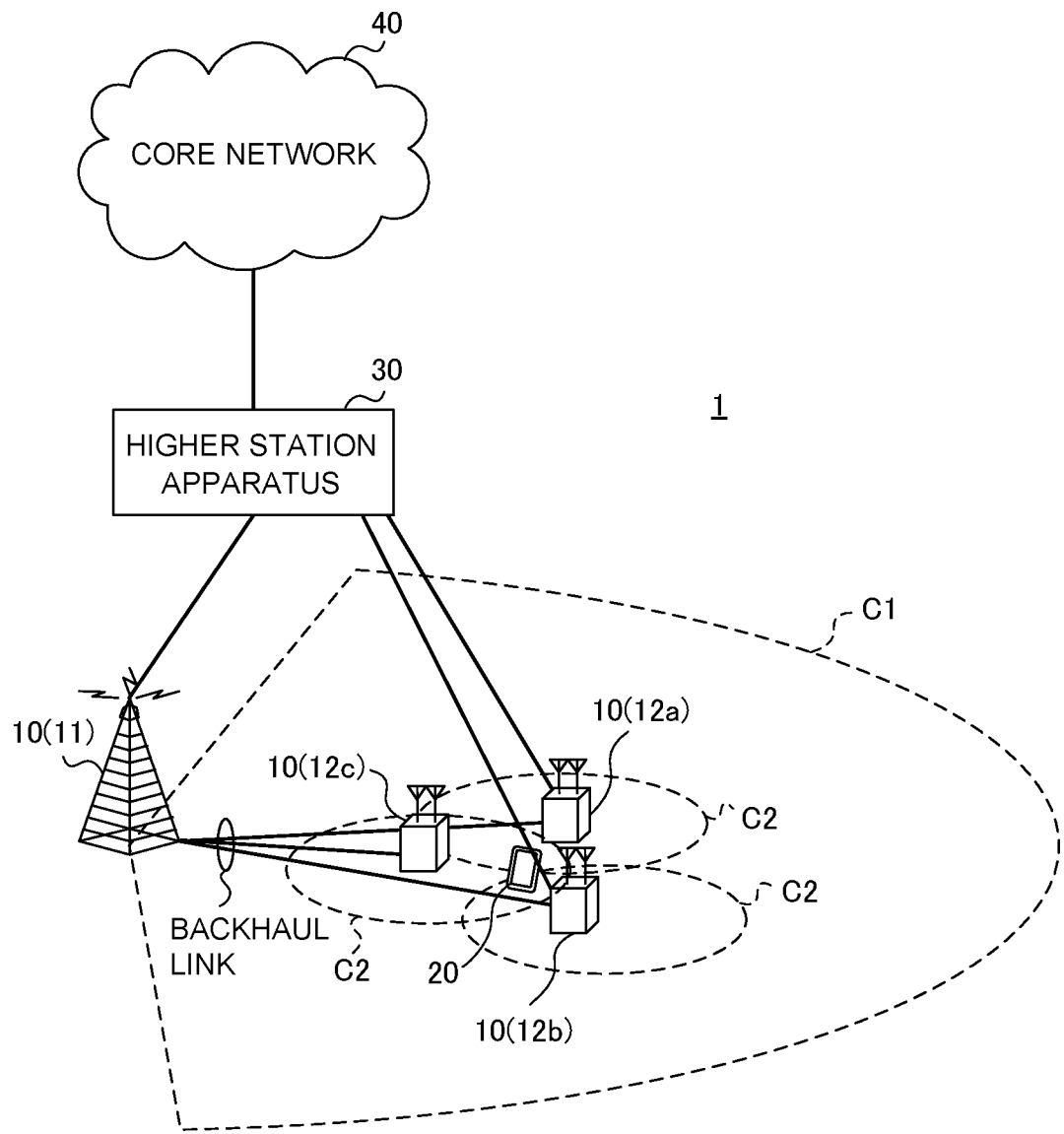
FIG. 11 is a diagram to show an example of a schematic structure of a radio communication system according to the present embodiment.

FIG. 11 is a diagram to show an example of a schematic structure of a radio communication system according to the present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit. Note that the radio communication system 1 may be referred to as "SUPER 3G," "LTE-A (LTE-Advanced)," "IMT-Advanced," "4G," "5G," "FRA (Future Radio Access)," "NR (New RAT)" and so on.

The radio communication system 1 shown in FIG. 11 includes a radio base station 11 that forms a macro cell C1, and radio base stations 12a to 12c that form small cells C2, which are placed within the macro cell C1 and which are narrower than the macro cell C1. Also, user terminals 20 are placed in the macro cell C1 and in each small cell C2. A configuration in which different numerologies are applied between cells may be adopted. Note that a "numerology" refers to a set of communication parameters that characterize the design of signals in a given RAT and the design of the RAT.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, two or more CCs). Furthermore, the user terminals can use license band CCs and unlicensed band CCs as a plurality of cells. Note that it is possible to adopt a configuration including a TDD carrier, in which shortened TTIs are applied to some of a plurality of cells.

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, 30 to 70 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals.

In the radio communication system 1, as radio access schemes, OFDMA (orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combinations of these, and OFDMA may be used in UL.

In the radio communication system 1, DL data channel (PDSCH (Physical Downlink Shared CHannel), which is also referred to as, for example, a "DL shared channel"), which is used by each user terminal 20 on a shared basis, a broadcast channel (PBCH (Physical Broadcast CHannel)), L1/L2 control channels and so on, are used as DL channels. User data, higher layer control information and SIBs (System Information Blocks) are communicated in the PDSCH. Also, the MIB (Master Information Block) is communicated in the PBCH.

The L1/L2 control channels include DL control channels (a PDCCH (Physical Downlink Control CHannel), an EPDCCH (Enhanced Physical Downlink Control CHannel) and so on), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. The EPDCCH is frequency-division-multiplexed with the PDSCH and used to communicate DCI and so on, like the PDCCH. HARQ retransmission command information (ACK/NACK) in response to the PUSCH can be communicated using at least one of the PHICH, the PDCCH and the EPDCCH.

In the radio communication system 1, UL data channel (PUSCH: Physical Uplink Shared CHannel, which is also referred to as "UL shared channel" and so on), which is used by each user terminal 20 on a shared basis, a UL control channel (PUCCH: Physical Uplink Control CHannel), a random access channel (PRACH: Physical Random Access CHannel) and so on are used as UL channels. User data, higher layer control information and so on are communicated by the PUSCH. Uplink control information (UCI), including at least one of retransmission command information (ACK/NACK), channel state information (CSI) and so on, is communicated in the PUSCH or the PUCCH. By means of the PRACH, random access preambles for establishing connections with cells are communicated.

(Radio Base Station)

Figure 12:
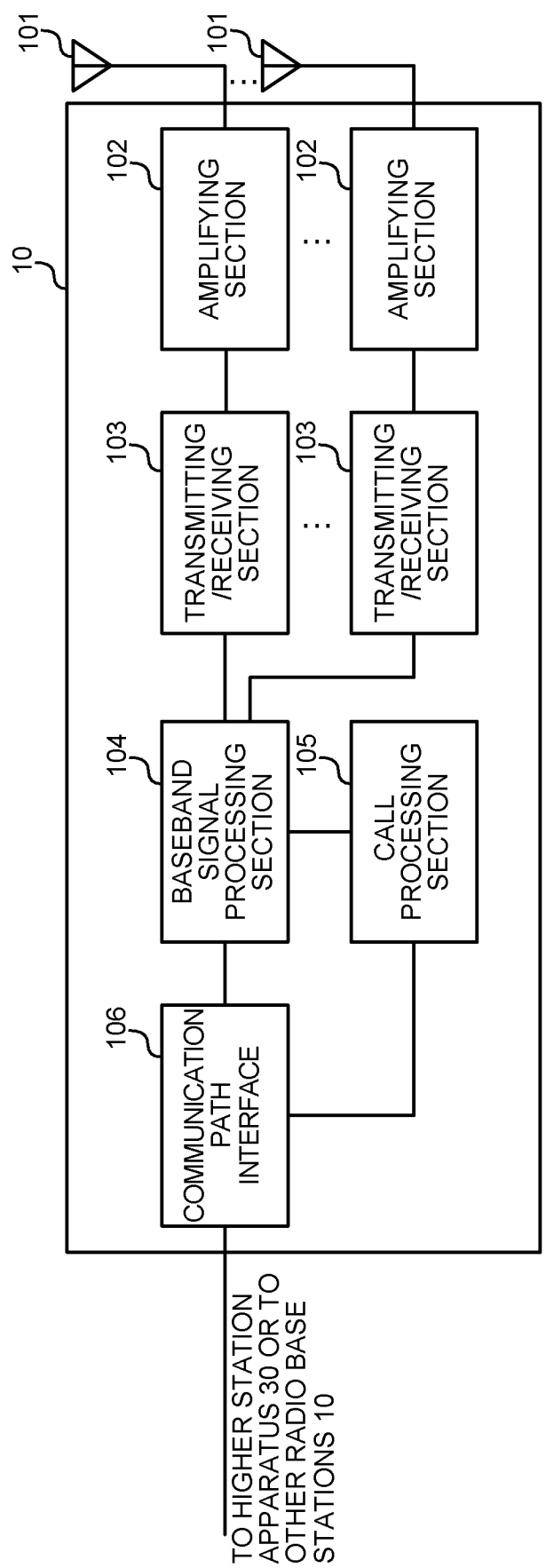
FIG. 12 is a diagram to show an example of an overall structure of a radio base station according to the present embodiment.

FIG. 12 is a diagram to show an example of an overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

DL data to be transmitted from the radio base station 10 to a user terminal 20 is input from the higher station apparatus 30 to the baseband signal processing section 104, via the communication path interface 106.

In the baseband signal processing section 104, the DL data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, DL control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are each amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, user data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 transmit DL signals (for example, DL control signals (DL control channels), DL data signals (DL data channels, DL shared channels and so on), DL reference signals (DM-RS, CSI-RS and so on), discovery signals, synchronization signals, broadcast signals and so on), and receive UL signals (for example, UL control signals (UL control channels), UL data signals (UL data channels, UL shared channels and so on), UL reference signals and so on).

To be more specific, the transmitting/receiving sections 103 transmit configuration information related to contention-based UL transmission (CBUL configuration information) by using system information or higher layer signaling. In addition, the transmitting/receiving sections 103 receive UL signals (at least one of preambles, control information, and UL data) transmitted from the user terminals 20 in contention-based UL transmission. In addition, the transmitting/receiving sections 103 transmits retransmission command information in response to the UL signals.

The transmission section and the receiving section of the present invention are comprised of a transmitting/receiving section 103 and/or a communication path interface 106.

Figure 13:
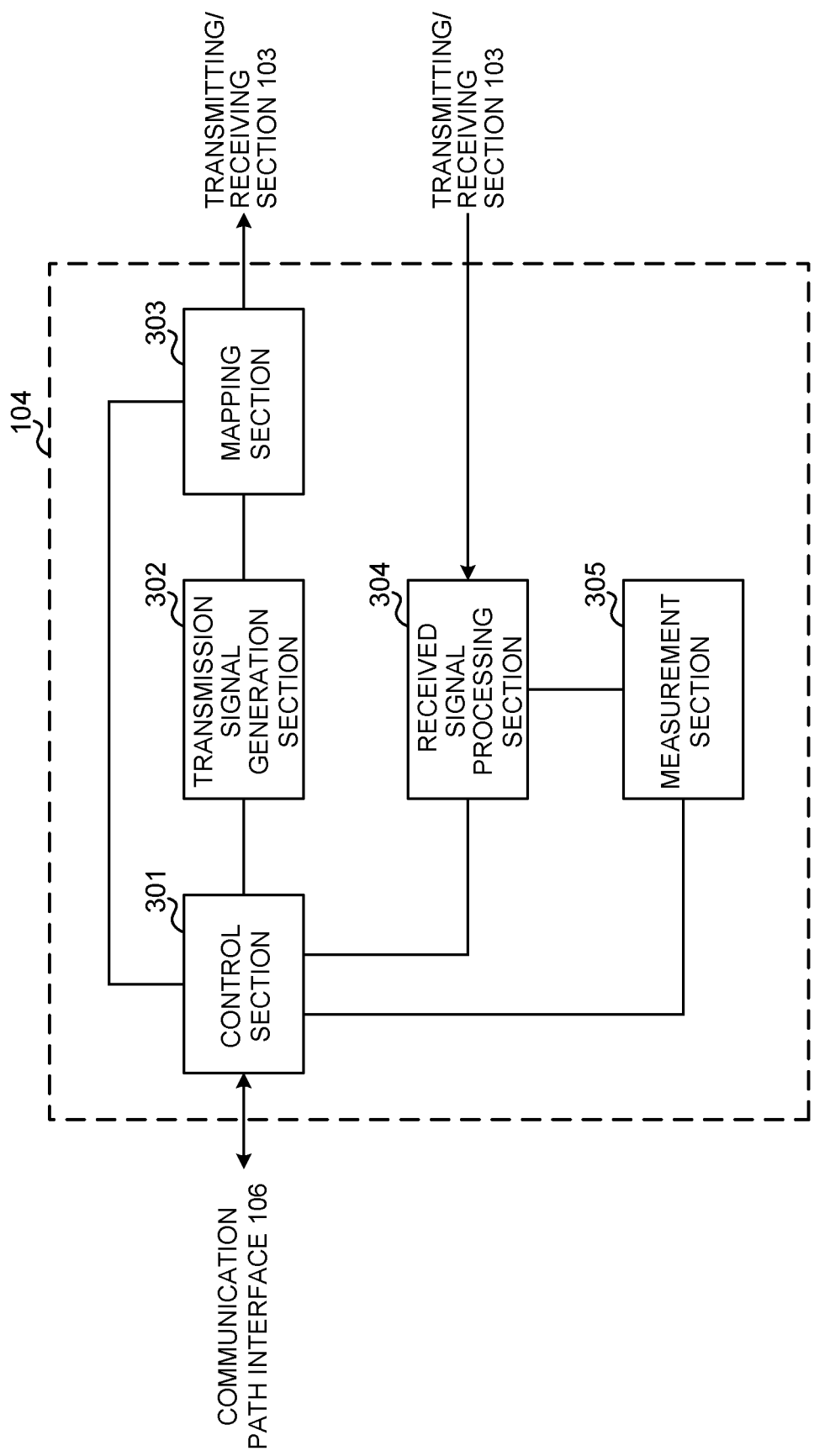
FIG. 13 is a diagram to show an example of a functional structure of a radio base station according to the present embodiment.

FIG. 13 is a diagram to show an example of a functional structure of a radio base station according to one embodiment of the present invention. Note that, although FIG. 13 primarily shows functional blocks that pertain to characteristic parts of the present embodiment, the radio base station 10 has other functional blocks that are necessary for radio communication as well. As shown in FIG. 13, the baseband signal processing section 104 at least has a control section 301, a transmission signal generation section 302, a mapping section 303, a received signal processing section 304 and a measurement section 305.

The control section 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of DL signals and/or UL signals. To be more specific, the control section 301 controls the transmission signal generation section 302, the mapping section 303 and the transmitting/receiving sections 103 to generate and transmit DCI (DL assignment) that includes DL data channel scheduling information and DCI (UL grant) that includes UL data channel scheduling information.

Furthermore, the control section 301 may control contention-based UL (CBUL) transmission, in which UL data is transmitted from the user terminals 20 without UL grants. For example, the control section 301 may determine the above-noted CBUL configuration information, including, for example, UL resources that can be used in contention-based UL transmission, and so on.

Furthermore, the control section 301 may control receipt of UL data according to the transmission format for contention-based UL transmission. Here, this transmission format may be comprised of an access channel for transmitting randomly-selected preambles, a control channel for transmitting control information for UL data, and a data channel for transmitting UL data.

For example, the control section 301 may detect UL transmissions based on the above preambles. Furthermore, the control section 301 may blind-decode UL control channels and identify the user terminals 20 based on the detected control information. Furthermore, the control section 301 may control the receiving process (demodulation, decoding, etc.) of UL data from the user terminals 20 in accordance with the above control information. Also, the control section 301 may control beam search and/or channel estimation, which are performed based on the above preambles.

The control section 301 may also control generation and transmission of retransmission command information that provides retransmission commands (ACKs or NACKs) for UL data in units of frequency resources (the first example of retransmission commands according to the first aspect). In addition, the control section 301 may control generation and transmission of retransmission command information that provides retransmission commands (ACKs or NACKs) for UL data in units of resource groups, which include frequency resources (the second example of retransmission commands according to the first aspect).

This retransmission command information can also provide retransmission commands in units of one or more time resources (the third example of retransmission commands according to the first aspect). The retransmission command information can also provide retransmission commands in units of terminal groups where one or more user terminals belong (the fourth example of retransmission commands according to the first aspect). This retransmission command information can be transmitted, for example, in a DL control channel or in a retransmission control channel.

In addition, the control section 301 may control transmission of the above retransmission command information using dedicated resources, which are frequency resource-specific or resource group-specific (FIG. 3A, FIG. 4A, FIG. 5A and FIG. 6A). Furthermore, the control section 301 may control transmission of the above retransmission command information using common resources, which are common to frequency resources or to resource groups (FIG. 3B, FIG. 4B, FIG. 5B and FIG. 6B).

Furthermore, the control section 301 may control receipt of the above-described UL data and transmission of the above-described retransmission command information by using a transmission time interval (TTI) that is comprised of a UL period, which is used to transmit UL data, a DL period, which is used to transmit retransmission command information, and a guard period, which is used to switch between the UL period and the DL period (second aspect).

Also, if a default retransmission command is defined with either an ACK or a NACK, the control section 301 may perform control so that only retransmission command information representing retransmission commands different from the default retransmission command is generated and transmitted (third aspect).

Furthermore, the control section 301 may exert control so that the redundancy versions to be applied to retransmission data are detected following predetermined rules, fixed redundancy versions are detected, or the redundancy versions to be applied to retransmission data are detected based on either explicit or implicit reporting from the user terminals 20 (fourth aspect).

The transmission signal generation section 302 generates DL signals (DL control channels, DL data channels, DL reference signals such as DM-RSs, and so on) based on commands from the control section 301 and outputs the DL signals to the mapping section 303. The transmission signal generation section 302 can be constituted by a signal generator, a signal generating circuit or signal generating apparatus that can be described based on general understanding of the technical field to which the present invention pertains.

The mapping section 303 maps the DL signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals are, for example, UL signals that are transmitted from the user terminals 20 (UL control channels, UL data channels, UL reference signals and so on). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, the received signal processing section 304 outputs at least one of a preamble, control information and UL data to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

The measurement section 305 may measure the received power (for example, the RSRP (Reference Signal Received Power)), the received quality (for example, RSRQ (Reference Signal Received Quality)), channel states and so on of the received signals. The measurement results may be output to the control section 301.

(User Terminal)

Figure 14:
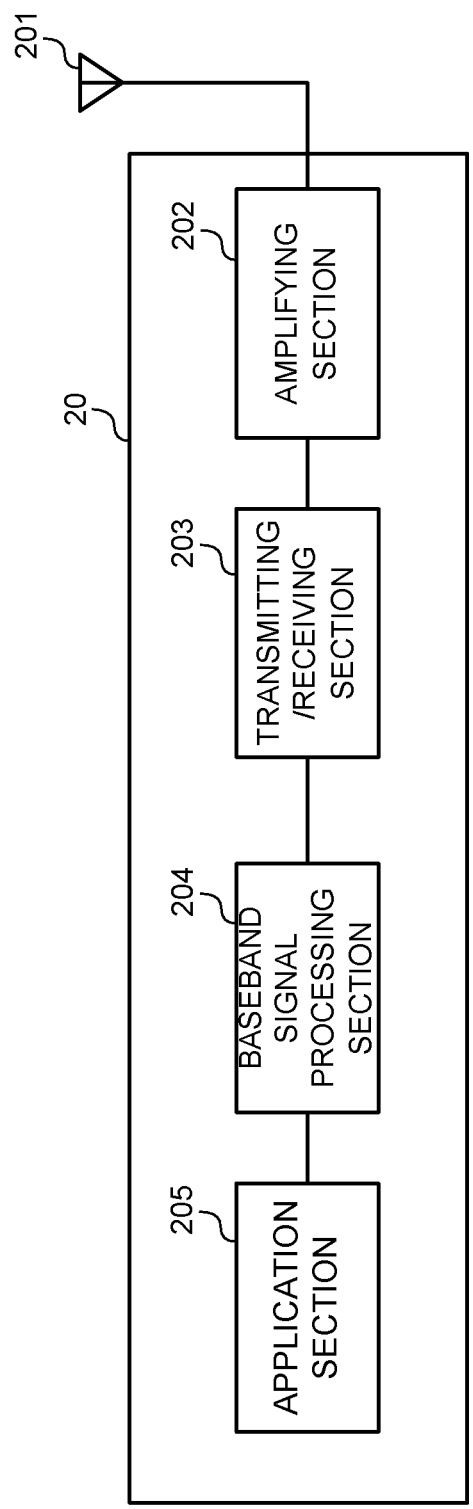
FIG. 14 is a diagram to show an example of an overall structure of a user terminal according to the present embodiment.

FIG. 14 is a diagram to show an example of an overall structure of a user terminal according to the present embodiment. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the DL signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process, and so on. The DL data is forwarded to the application section 205. The application section 205 performs processes related to higher layers above the physical layer and the MAC layer, and so on. Also, in the DL data, the system information and the higher layer control information are also forwarded to the application section 205.

Meanwhile, the UL data is input from the application section 205 to the baseband signal processing section 204.

The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving sections 203 receive DL signals (for example, DL control signals (DL control channels), DL data signals (DL data channels, DL shared channels and so on), DL reference signals (DM-RS, CSI-RS and so on), discovery signals, synchronization signals, broadcast signals and so on), and transmit UL signals (for example, UL control signals (UL control channels), UL data signals (UL data channels, UL shared channels and so on), UL reference signals and so on).

To be more specific, the transmitting/receiving sections 203 receive configuration information related to contention-based UL transmission (CBUL configuration information) using system information or higher layer signaling. In addition, the transmitting/receiving sections 203 transmit UL signal (at least one of preambles, control information and UL data) based on the transmission format for contention-based UL transmission. In addition, the transmitting/receiving sections 203 receive retransmission command information in response to the UL signals.

Figure 15:
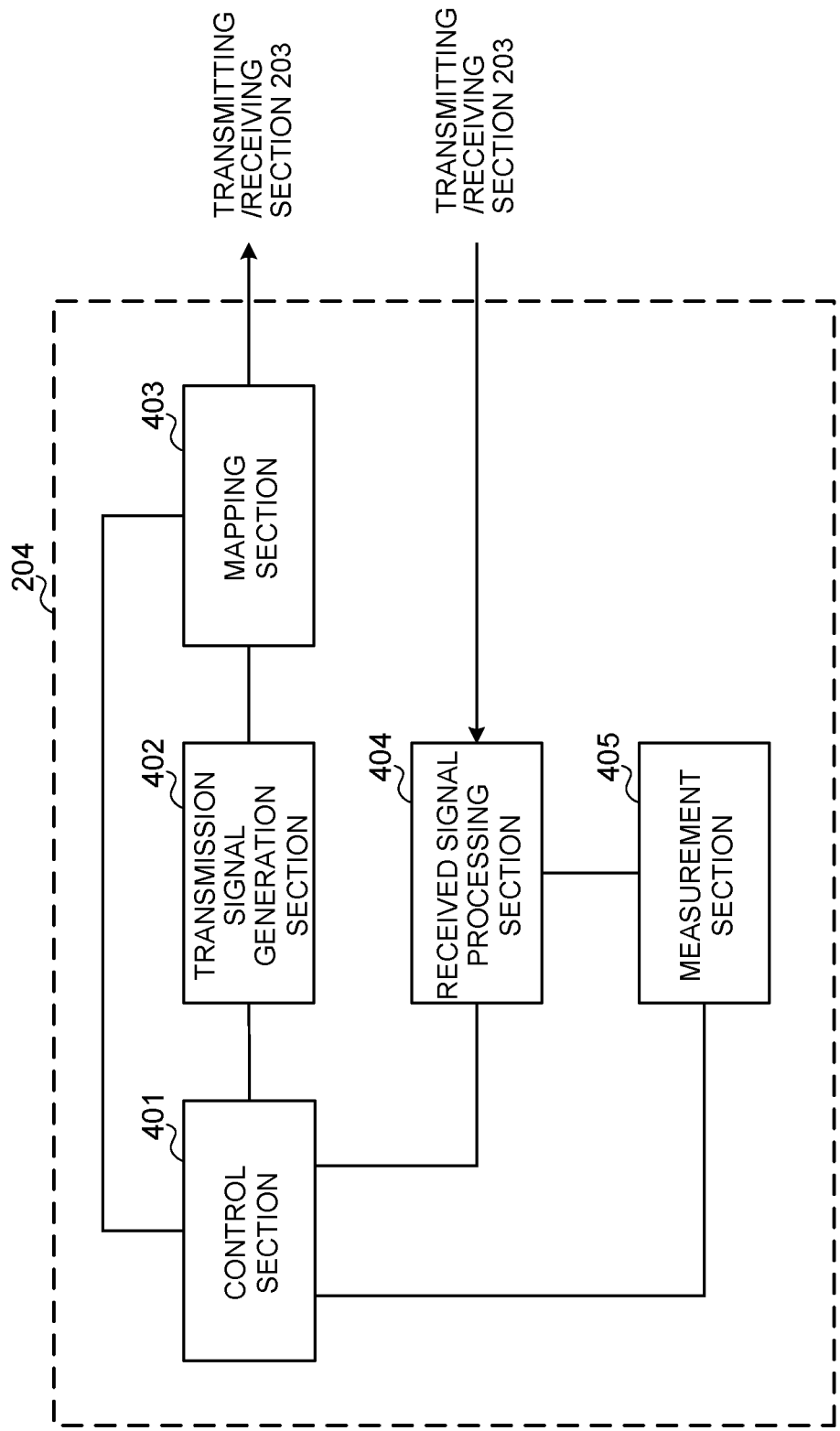
FIG. 15 is a diagram to show an example of a functional structure of a user terminal according to the present embodiment.

FIG. 15 is a diagram to show an example of a functional structure of a user terminal according to one embodiment of the present invention. Note that, although FIG. 15 primarily shows functional blocks that pertain to characteristic parts of the present embodiment, the user terminal 20 has other functional blocks that are necessary for radio communication as well. As shown in FIG. 15, the baseband signal processing section 204 provided in the user terminal 20 at least has a control section 401, a transmission signal generation section 402, a mapping section 403, a received signal processing section 404 and a measurement section 405.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires a DL control channel and a DL data channel transmitted from the radio base station 10 from the received signal processing section 404. To be more specific, the control section 401 controls the transmitting/receiving sections 203 and the received signal processing section 404 to blind-decode the DL control channel to detect DCI, and receive the DL data channel based on the DCI. In addition, the control section 401 estimates channel gain based on DL reference signals and demodulates the DL data channel based on the estimated channel gain.

The control section 401 may control transmission of retransmission control information (for example, HARQ-ACK, etc.) transmitted in a UL control channel or a UL data channel, based on the result of deciding whether or not retransmission control is necessary for the DL data channel, and so on. Furthermore, the control section 401 may control transmission of channel state information (CSI), which is generated based on DL reference signals.

In addition, the control section 401 controls contention-based UL transmission (CBUL). To be more specific, the control section 401 may control UL data transmission without UL grants, in accordance with the transmission format for contention-based UL transmission.

Furthermore, the control section 401 may determine the UL resource to use in contention-based UL transmission based on the above CBUL configuration information. This UL resource may be at least one of a time resource, a frequency resource, a resource group, a code resource, a power resource, and a space resource. Furthermore, the control section 401 may randomly select preambles from a plurality of preambles shown in the CBUL configuration information.

In addition, the control section 401 may control retransmission of UL data based on retransmission command information that provides UL data retransmission commands (ACKs or NACKs) in frequency resource units (the first example of retransmission commands according to the first aspect). In addition, the control section 301 may control retransmission of UL data based on retransmission command information that provides UL data retransmission commands (ACKs or NACKs) in units of resource groups, which include frequency resources (the second example of retransmission commands according to the first aspect).

This retransmission command information can also provide retransmission commands in units of one or more time resources (the third example of retransmission commands according to the first aspect). This retransmission command information can also provide retransmission commands in units of terminal groups where one or more user terminals belong (the fourth example of retransmission commands according to the first aspect). This retransmission command information can be transmitted, for example, in a DL control channel or in a retransmission control channel.

Also, the control section 401 may control receipt and detection of the above retransmission command information using dedicated resources, which are frequency resource-specific or resource group-specific (FIG. 3A, FIG. 4A, FIG. 5A and FIG. 6A). In addition, the control section 301 may control receipt and detection of the above retransmission command information using common resources, which are common to frequency resources or to resource groups (FIG. 3B, FIG. 4B, FIG. 5B and FIG. 6B).

Furthermore, the control section 401 may control receipt of the above-described UL data and transmission of the above-described retransmission command information by using a transmission time interval (TTI) that is comprised of a UL period, which is used to transmit UL data, a DL period, which is used to transmit retransmission command information, and a guard period, which is used to switch between the UL period and the DL period (second aspect).

Also, if a default retransmission command is defined with either an ACK or a NACK and no retransmission command information is received from the radio base station 10 in a predetermined period, the control section 401 may perform default retransmission command detection operation (third aspect).

Furthermore, the control section 401 may control the redundancy versions to be applied to retransmission data (fourth aspect). For example, the control section 401 may select redundancy versions following predetermined rules, select fixed redundancy versions, or report the redundancy versions to apply to retransmission data to the radio base station 10 explicitly or implicitly (fourth aspect).

The transmission signal generation section 402 generates UL signals (UL control channels, UL data signals, UL reference signals and so on) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

Also, the transmission signal generation section 402 generates TPC commands based on commands from the control section 401. Also, the transmission signal generation section 402 generates UL data channels based on commands from the control section 401. For example, when a UL grant is included in a DL control channel that is reported from the radio base station 10, the control section 401 commands the transmission signal generation section 402 to generate the UL data channel.

The mapping section 403 maps the UL signals generated in the transmission signal generation section 402 to radio resources based on commands from the control section 401, and output the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signal include, for example, DL signals transmitted from the radio base station 10 (DL control channels, DL data channels, DL reference signals and so on). The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

Based on commands from control section 401, the received signal processing section 404 performs blind decoding of the DL control channel, which schedules transmission and/or reception of the DL data channel, and performs the receiving process of the DL data channel based on this DCI. In addition, the received signal processing section 404 estimates channel gain based on the DM-RS or the CRS, and demodulates the DL data channel based on the estimated channel gain.

The received signal processing section 404 outputs the decoded information, acquired through the receiving processes, to the control section 401. The received signal processing section 404 outputs, for example, broadcast information, system information, RRC signaling, DCI and so on, to the control section 401. The received signal processing section 404 may output the decoding result of the data to the control section 401. Also, the received signal processing section 404 outputs the received signals, the signals after the receiving processes and so on, to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

The measurement section 405 may measure, for example, the received power (for example, RSRP), the DL received quality (for example, RSRQ), channel states and so on of the received signals. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 16:
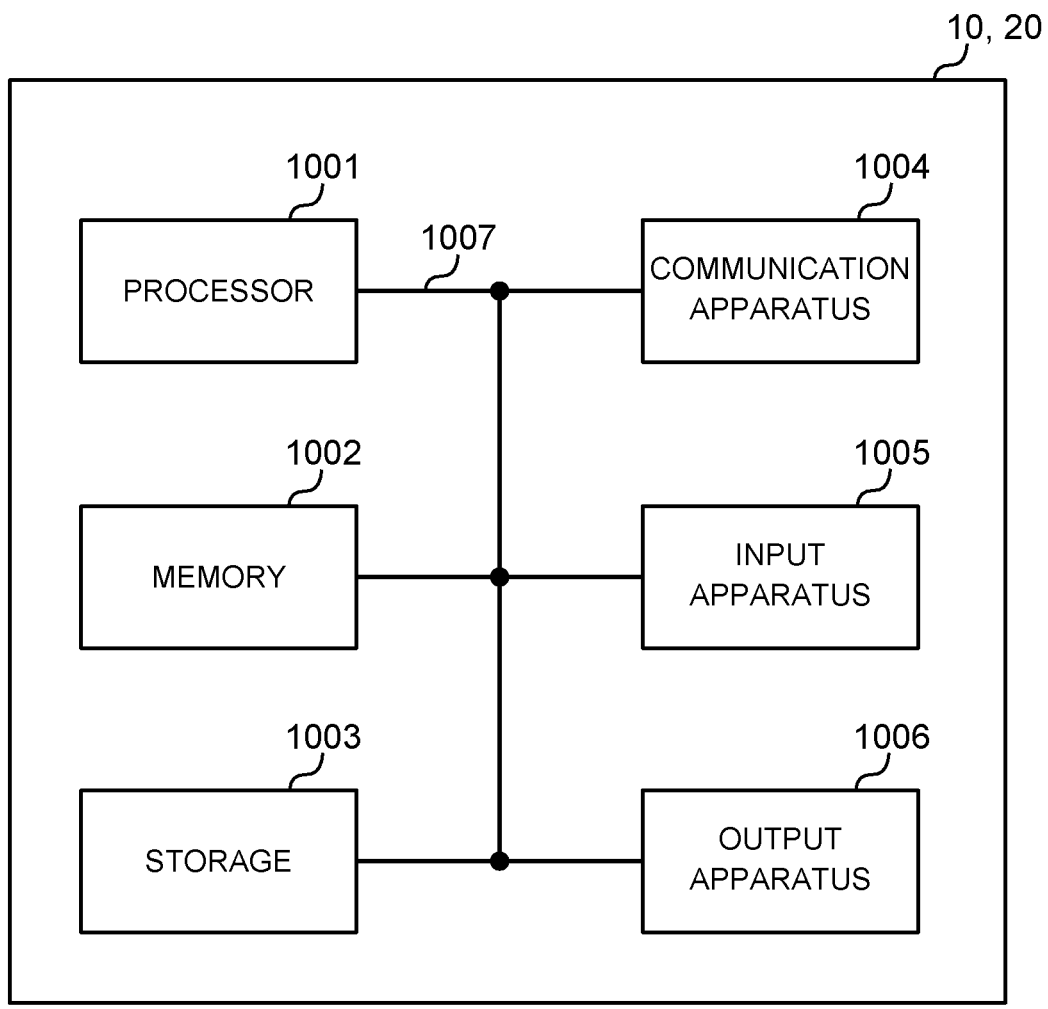
FIG. 16 is a diagram to show an example hardware structure of a radio base station and a user terminal according to the present embodiment.

That is, a radio base station, a user terminal and so on according to an embodiment of the present invention may function as a computer that executes the processes of the radio communication method of the present invention. FIG. 16 is a diagram to show an example of a hardware structure of a radio base station and a user terminal according to the present embodiment. Physically, the above-described radio base stations 10 and user terminals 20 may be formed as a computer apparatus that includes a processor 1001, a memory 1002, a storage 1003, communication apparatus 1004, input apparatus 1005, output apparatus 1006 And a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by allowing predetermined software (programs) to be read on hardware such as the processor 1001 and the memory 1002, and by allowing the processor 1001 to do calculations, the communication apparatus 1004 to communicate, and the memory 1002 and the storage 1003 to read and/or write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and/or the like for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be comprised of a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these types of apparatus, including the processor 1001, the memory 1002 and others, are connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier" (CC) may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. Furthermore, a slot may be comprised of one or more symbols in the time domain (OFDM (Orthogonal Frequency Division Multiplexing) symbols, SC-FDMA (Single Carrier Frequency Division Multiple Access) symbols, and so on).

A radio frame, a subframe, a slot and a symbol all represent the time unit in signal communication. A radio frames, a subframe, a slot and a symbol may be each called by other applicable names. For example, one subframe may be referred to as a "transmission time interval (TTI)," or a plurality of consecutive subframes may be referred to as a "TTI," and one slot may be referred to as a "TTI." That is, a subframe and a TTI may be a subframe (1 ms) in existing LTE, may be a shorter period than 1 ms (for example, one to thirteen symbols), or may be a longer period of time than 1 ms.

Here, a TTI refers to the minimum time unit of scheduling in radio communication, for example. For example, in LTE systems, a radio base station schedules the allocation of radio resources (such as the frequency bandwidth and transmission power that can be used by each user terminal) for each user terminal in TTI units. Note that the definition of TTIs is not limited to this. The TTI may be the transmission time unit of channel-encoded data packets (transport blocks), or may be the unit of processing in scheduling, link adaptation and so on.

A TTI having a time duration of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "shortened subframe," a "short subframe," or the like.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one TTI in length. One TTI and one subframe each may be comprised of one or more resource blocks. Note that an RB may be referred to as a "physical resource block (PRB: Physical RB)," a "PRB pair," an "RB pair," or the like.

Furthermore, a resource block may be comprised of one or more resource elements (REs). For example, one RE may be a radio resource field of one subcarrier and one symbol.

Note that the above-described structures of radio frames, subframes, slots, symbols and so on are merely examples. For example, configurations such as the number of subframes included in a radio frame, the number of slots included in a subframe, the number of symbols and RBs included in a slot, the number of subcarriers included in an RB, the number of symbols in a TTI, the symbol duration and the cyclic prefix (CP) length can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input may be transmitted to other pieces of apparatus. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information" (L1/L2 control signals), "L1 control information" (L1 control signal) and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs: Remote Radio Heads)). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D: Device-to-Device). In this case, user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The examples/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

Note that the radio communication system 1 may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (Global System for Mobile communications) (registered trademark), CDMA 2000, UMB (Ultra Mobile Broadband), IEEE 802.11 (Wi-Fi (registered trademark)), IEEE 802.16 (WiMAX(registered trademark)), IEEE 802.20, WB (Ultra-WideBand), Bluetooth (registered trademark) and other appropriate radio communication technologies, and/or may be applied to next-generation systems that are enhanced base on these radio communication technologies.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method for distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
   a transmitter that performs uplink (UL) transmission without a UL grant using a resource configured by higher layer signaling;
   a receiver that receives retransmission command information, which indicates a retransmission command associated with the UL transmission using the resource; and
   a processor that controls a redundancy version and a resource used for retransmission of the UL transmission by units of symbols based on the retransmission command information,
   wherein the receiver receives the retransmission command information, which indicates the retransmission command associated with the UL transmission without the UL grant, transmitted in a downlink (DL) control channel during a DL period configured by higher layer signaling, and
   wherein the resource used for retransmission of the UL transmission is indicated by the retransmission command information.

2. The terminal according to claim 1, wherein the retransmission command information is not transmitted when retransmission of the UL transmission is unnecessary.

3. A radio communication method for a terminal, comprising:
   performing uplink (UL) transmission without a UL grant using a resource configured by higher layer signaling;
   receiving retransmission command information, which indicates a retransmission command associated with the UL transmission using the resource;
   controlling a redundancy version and a resource used for retransmission of the UL transmission by units of symbols based on the retransmission command information; and
   receiving the retransmission command information, which indicates the retransmission command associated with the UL transmission without the UL grant, transmitted in a downlink (DL) control channel during a DL period configured by higher layer signaling, wherein the resource used for retransmission of the UL transmission is indicated by the retransmission command information.

4. A base station comprising:

a processor that configures a resource, for uplink (UL) transmission without a UL grant, in a terminal via higher layer signaling; and a transmitter that transmits retransmission command information, which indicates a retransmission command associated with the UL transmission using the resource, for controlling a redundancy version and a resource used for a retransmission of the UL transmission by units of symbols, wherein the transmitter transmits the retransmission command information, which indicates the retransmission command associated with the UL transmission without the UL grant, transmitted in a downlink (DL) control channel during a DL period configured by higher layer signaling, and wherein the resource used for retransmission of the UL transmission is indicated by the retransmission command information.

5. A system comprising a terminal and a base station, wherein:

the terminal comprises:

a transmitter that performs uplink (UL) transmission without a UL grant using a resource configured by higher layer signaling;

a receiver that receives retransmission command information, which indicates a retransmission command associated with the UL transmission using the resource;

a processor that controls a redundancy version and a resource used for retransmission of the UL transmission by units of symbols based on the retransmission command information, wherein the receiver receives the retransmission command information, which indicates the retransmission command associated with the UL transmission without the UL grant, transmitted in a downlink (DL) control channel during a DL period configured by higher layer signaling, and wherein the resource used for retransmission of the UL transmission is indicated by the retransmission command information; and the base station comprises:

a processor that configures the resource for the UL transmission in the terminal via higher layer signaling; and a transmitter that transmits the retransmission command information for controlling the resource used for the retransmission of the UL transmission.

* * * * *